(12) United States Patent
Sawai

(10) Patent No.: US 10,764,824 B2
(45) Date of Patent: *Sep. 1, 2020

(54) COMMUNICATION CONTROL APPARATUS, TERMINAL APPARATUS, COMMUNICATION CONTROL METHOD, PROGRAM, AND COMMUNICATION CONTROL SYSTEM

(71) Applicant: Sony Corporation, Tokyo (JP)

(72) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 15/985,363

(22) Filed: May 21, 2018

(65) Prior Publication Data

US 2018/0270749 A1    Sep. 20, 2018

Related U.S. Application Data

(63) Continuation of application No. 14/422,811, filed as application No. PCT/JP2013/068068 on Jul. 1, 2013, now Pat. No. 9,998,985.

(30) Foreign Application Priority Data

Aug. 31, 2012 (JP) ................. 2012-191286

(51) Int. Cl.
*H04W 48/20* (2009.01)
*H04W 16/32* (2009.01)
(Continued)

(52) U.S. Cl.
CPC ........... *H04W 48/20* (2013.01); *H04W 16/32* (2013.01); *H04W 76/10* (2018.02);
(Continued)

(58) Field of Classification Search
CPC ..... H04W 16/32; H04W 48/20; H04W 76/10; H04W 84/045; H04W 88/04; H04W 88/12; H04W 76/02
See application file for complete search history.

(56) References Cited

U.S. PATENT DOCUMENTS 8,018,888 B1    9/2011  Fuller et al.
8,018,893 B2    9/2011  Sartori et al.
(Continued)

FOREIGN PATENT DOCUMENTS

CN    102369755 A    3/2012
CN    102484804 A    5/2012
(Continued)

OTHER PUBLICATIONS

Extended European Search Report dated Feb. 5, 2019 in connection with European Application No. 18205719.0.
(Continued)

*Primary Examiner* — Steven H Nguyen
(74) *Attorney, Agent, or Firm* — Wolf, Greenfield & Sacks, P.C.

(57) ABSTRACT

There is provided a communication control apparatus including a determination unit that, when a mobile station communicates with any of one or more cells, determines whether the mobile station should communicate via an access point, a selection unit that, when it is determined that the mobile station should communicate via the access point, selects an apparatus that operates as the access point for the mobile station, and a signaling unit that instructs the apparatus selected by the selection unit to operate as the access point, and instructs the mobile station to communicate via the apparatus.

19 Claims, 14 Drawing Sheets

(51) Int. Cl.
*H04W 76/10* (2018.01)
*H04W 84/04* (2009.01)
*H04W 88/04* (2009.01)
*H04W 88/12* (2009.01)

(52) U.S. Cl.
CPC .......... *H04W 84/045* (2013.01); *H04W 88/04* (2013.01); *H04W 88/12* (2013.01)

(56) References Cited

U.S. PATENT DOCUMENTS

| | | | |
|---|---|---|---|
| 8,116,792 B2 * | 2/2012 | Aaron | H04W 72/082 455/448 |
| 8,249,631 B2 | 8/2012 | Sawai | |
| 8,265,684 B2 | 9/2012 | Sawai | |
| 8,391,794 B2 | 3/2013 | Sawai et al. | |
| 8,452,240 B2 | 5/2013 | Takahashi | |
| 8,521,080 B2 | 8/2013 | Sakoda et al. | |
| 8,533,370 B2 | 9/2013 | Tanaka et al. | |
| 8,543,120 B2 | 9/2013 | Mizusawa | |
| 8,577,406 B2 | 11/2013 | Sawai et al. | |
| 8,588,829 B2 | 11/2013 | Sawai | |
| 8,639,281 B2 | 1/2014 | Sawai et al. | |
| 8,923,877 B2 * | 12/2014 | Youtz | H04W 72/082 455/452.2 |
| 8,934,367 B2 | 1/2015 | Mizusawa et al. | |
| 8,995,942 B2 | 3/2015 | Watanabe | |
| 9,078,243 B2 | 7/2015 | Sawai | |
| 9,131,387 B2 | 9/2015 | Sawai et al. | |
| 9,137,761 B2 | 9/2015 | Sawai | |
| 9,215,670 B2 | 12/2015 | Sawai et al. | |
| 9,313,721 B2 | 4/2016 | Abe et al. | |
| 9,363,767 B2 | 6/2016 | Kimura et al. | |
| 9,380,575 B2 | 6/2016 | Sawai | |
| 9,480,053 B2 | 10/2016 | Takano et al. | |
| 9,491,716 B2 | 11/2016 | Sawai et al. | |
| 9,510,302 B2 | 11/2016 | Sawai et al. | |
| 9,516,639 B2 | 12/2016 | Takano | |
| 9,538,548 B2 | 1/2017 | Mizusawa | |
| 9,544,780 B2 | 1/2017 | Takano | |
| 9,621,328 B2 | 4/2017 | Takano et al. | |
| 9,622,191 B2 | 4/2017 | Kimura et al. | |
| 9,661,587 B2 | 5/2017 | Sawai | |
| 9,681,437 B2 | 6/2017 | Takano | |
| 9,775,119 B2 | 9/2017 | Sawai et al. | |
| 9,807,738 B2 | 10/2017 | Takano et al. | |
| 9,820,168 B2 | 11/2017 | Sawai et al. | |
| 9,825,751 B2 | 11/2017 | Takano et al. | |
| 9,894,657 B2 | 2/2018 | Kimura et al. | |
| 9,900,887 B2 | 2/2018 | Takano | |
| 9,936,511 B2 | 4/2018 | Takano | |
| 9,986,552 B2 | 5/2018 | Takano | |
| 9,998,985 B2 * | 6/2018 | Sawai | H04W 48/20 |
| 2003/0060202 A1 | 3/2003 | Roberts | |
| 2004/0063451 A1 | 4/2004 | Bonta et al. | |
| 2006/0199530 A1 | 9/2006 | Kawasaki | |
| 2007/0214254 A1 | 9/2007 | Aguink | |
| 2007/0280172 A1 | 12/2007 | Tan et al. | |
| 2008/0188177 A1 | 8/2008 | Tan et al. | |
| 2008/0285501 A1 | 11/2008 | Zhang et al. | |
| 2009/0088070 A1 | 4/2009 | Aaron | |
| 2009/0239466 A1 | 9/2009 | Saitou et al. | |
| 2010/0039947 A1 | 2/2010 | Li et al. | |
| 2010/0167743 A1 * | 7/2010 | Palanki | H04B 7/155 455/436 |
| 2010/0169498 A1 | 7/2010 | Palanki et al. | |
| 2010/0248613 A1 | 9/2010 | Miyoshi et al. | |
| 2010/0274900 A1 | 10/2010 | Javaid et al. | |
| 2011/0013571 A1 | 1/2011 | Sawai | |
| 2011/0028170 A1 | 2/2011 | Sawai | |
| 2011/0028179 A1 | 2/2011 | Sawai et al. | |
| 2011/0028180 A1 | 2/2011 | Sawai | |
| 2011/0034204 A1 | 2/2011 | Sawai et al. | |
| 2011/0039495 A1 | 2/2011 | Sawai et al. | |
| 2011/0065379 A1 | 3/2011 | Sakoda et al. | |
| 2011/0065466 A1 | 3/2011 | Sakoda et al. | |
| 2011/0076965 A1 | 3/2011 | Takahashi | |
| 2011/0081870 A1 | 4/2011 | Watanabe | |
| 2011/0106984 A1 | 5/2011 | Tanaka et al. | |
| 2011/0117907 A1 * | 5/2011 | Hooli | H04W 72/02 455/422.1 |
| 2011/0134827 A1 * | 6/2011 | Hooli | H04W 72/04 370/315 |
| 2011/0244859 A1 | 10/2011 | Tsuda | |
| 2011/0244871 A1 | 10/2011 | Mizusawa | |
| 2012/0163283 A1 | 6/2012 | Kim et al. | |
| 2012/0190339 A1 | 7/2012 | Abe et al. | |
| 2012/0309439 A1 | 12/2012 | Sawai | |
| 2012/0315841 A1 | 12/2012 | Zhou et al. | |
| 2013/0034001 A1 | 2/2013 | Mizusawa et al. | |
| 2013/0044579 A1 * | 2/2013 | Pan | H04B 7/2618 370/201 |
| 2013/0100893 A1 | 4/2013 | Sawai | |
| 2013/0102344 A1 | 4/2013 | Sawai | |
| 2013/0102350 A1 | 4/2013 | Sawai et al. | |
| 2013/0170387 A1 * | 7/2013 | Wang | H04W 4/70 370/252 |
| 2013/0217429 A1 | 8/2013 | Kimura et al. | |
| 2013/0286873 A1 * | 10/2013 | Wilkinson | H04W 72/1231 370/252 |
| 2013/0316756 A1 | 11/2013 | Sawai et al. | |
| 2014/0045542 A1 | 2/2014 | Sawai | |
| 2014/0086141 A1 | 3/2014 | Morioka | |
| 2014/0133335 A1 | 5/2014 | Morioka | |
| 2014/0155118 A1 | 6/2014 | Tsuda | |
| 2014/0198657 A1 | 7/2014 | Ji | |
| 2014/0302867 A1 | 10/2014 | Mizusawa | |
| 2014/0307685 A1 | 10/2014 | Takano | |
| 2015/0110083 A1 | 4/2015 | Takano | |
| 2015/0117348 A1 | 4/2015 | Takano et al. | |
| 2015/0119064 A1 | 4/2015 | Takano | |
| 2015/0139108 A1 | 5/2015 | Takano | |
| 2015/0156006 A1 | 6/2015 | Takano et al. | |
| 2015/0156729 A1 | 6/2015 | Sawai et al. | |
| 2015/0195064 A1 | 7/2015 | Takano | |
| 2015/0215962 A1 | 7/2015 | Mizusawa | |
| 2015/0230168 A1 | 8/2015 | Sawai | |
| 2015/0230243 A1 | 8/2015 | Sawai | |
| 2015/0334664 A1 | 11/2015 | Sawai et al. | |
| 2015/0351045 A1 | 12/2015 | Sawai | |
| 2016/0073356 A1 | 3/2016 | Sawai et al. | |
| 2016/0080135 A1 | 3/2016 | Takano et al. | |
| 2016/0135157 A1 | 5/2016 | Takano | |
| 2016/0278157 A1 | 9/2016 | Sawai | |
| 2016/0337983 A1 | 11/2016 | Sawai | |
| 2016/0366653 A1 | 12/2016 | Sawai et al. | |
| 2017/0041937 A1 | 2/2017 | Takano | |
| 2017/0079023 A1 | 3/2017 | Takano et al. | |
| 2017/0086145 A1 | 3/2017 | Sawai | |
| 2017/0164343 A9 | 6/2017 | Takano | |
| 2017/0188365 A1 | 6/2017 | Kimura et al. | |
| 2017/0359785 A1 | 12/2017 | Sawai et al. | |
| 2018/0049178 A1 | 2/2018 | Takano et al. | |
| 2018/0062822 A1 | 3/2018 | Takano et al. | |

FOREIGN PATENT DOCUMENTS

| | | |
|---|---|---|
| EP | 2 209 333 A2 | 7/2010 |
| EP | 2391179 A1 | 11/2011 |
| JP | 2003-249937 A | 9/2003 |
| JP | 2006-332862 A | 12/2006 |
| JP | 2010-187371 A | 8/2010 |
| WO | WO 2009/080959 A1 | 7/2009 |
| WO | WO 2010/053544 A2 | 5/2010 |

OTHER PUBLICATIONS

No Author Listed, Requirements, candidate solutions & technology roadmap for LTE Rel-12 onward. 3GPP Workshop on Release 12 and Onwards. NTT Docomo Inc. Jun. 11-12, 2012, 27 pages.
U.S. Appl. No. 12/838,605, filed Jul. 19, 2010, Sawai et al.
U.S. Appl. No. 12/840,809, filed Jul. 21, 2010, Sawai.

(56) References Cited

OTHER PUBLICATIONS

U.S. Appl. No. 12/840,831, filed Jul. 21, 2010, Sawai.
U.S. Appl. No. 12/844,188, filed Jul. 27, 2010, Sawai et al.
U.S. Appl. No. 12/849,210, filed Aug. 3, 2010, Sawai et al.
U.S. Appl. No. 12/873,478, filed Sep. 1, 2010, Sakoda et al.
U.S. Appl. No. 12/873,492, filed Sep. 1, 2010, Sakoda et al.
U.S. Appl. No. 12/883,870, filed Sep. 16, 2010, Takahashi.
U.S. Appl. No. 12/890,768, filed Sep. 27, 2010, Watanabe.
U.S. Appl. No. 12/909,637, filed Oct. 21, 2010, Tanaka et al.
U.S. Appl. No. 13/053,554, filed Mar. 22, 2011, Mizusawa.
U.S. Appl. No. 13/069,103, filed Mar. 22, 2011, Tsuda.
U.S. Appl. No. 13/394,404, filed Apr. 16, 2012, Abe et al.
U.S. Appl. No. 13/550,857, filed Jul. 17, 2012, Mizusawa et al.
U.S. Appl. No. 13/587,312, filed Aug. 16, 2012, Sawai.
U.S. Appl. No. 13/655,002, filed Oct. 18, 2012, Sawai et al.
U.S. Appl. No. 13/807,825, filed Jun. 15, 2011, Sawai.
U.S. Appl. No. 13/807,898, filed Dec. 31, 2012, Sawai.
U.S. Appl. No. 13/880,963, filed Apr. 22, 2013, Kimura et al.
U.S. Appl. No. 13/954,609, filed Jul. 30, 2013, Sawai et al.
U.S. Appl. No. 14/049,328, filed Oct. 9, 2013, Sawai.
U.S. Appl. No. 14/234,796, filed Jan. 24, 2014, Tsuda.
U.S. Appl. No. 14/346,412, filed May 28, 2014, Takano.
U.S. Appl. No. 14/358,279, filed May 15, 2014, Mizusawa.
U.S. Appl. No. 14/397,906, filed Oct. 30, 2014, Takano et al.
U.S. Appl. No. 14/402,854, filed Nov. 21, 2014, Takano.
U.S. Appl. No. 14/402,896, filed Nov. 21, 2014, Takano.
U.S. Appl. No. 14/406,364, dated Dec. 8, 2014, Takano.
U.S. Appl. No. 14/409,577, filed Dec. 19, 2014, Takano.
U.S. Appl. No. 14/409,609, filed Dec. 19, 2014, Sawai et al.
U.S. Appl. No. 14/409,628, filed Dec. 19, 2014, Takano et al.
U.S. Appl. No. 14/418,949, filed Feb. 1, 2015, Mizusawa.
U.S. Appl. No. 14/422,811, filed Feb. 20, 2015, Sawai.
U.S. Appl. No. 14/463,850, filed Aug. 20, 2014, Sawai.
U.S. Appl. No. 14/696,941, filed Apr. 27, 2015, Sawai.
U.S. Appl. No. 14/810,825, filed Jul. 28, 2015, Sawai et al.
U.S. Appl. No. 14/824,701, filed Aug. 12, 2015, Sawai.
U.S. Appl. No. 14/942,891, filed Nov. 16, 2015, Sawai et al.
U.S. Appl. No. 14/946,694, filed Nov. 19, 2015, Takano et al.
U.S. Appl. No. 15/002,234, filed Jan. 20, 2016, Takano.
U.S. Appl. No. 15/157,137, filed May 17, 2016, Kimura et al.
U.S. Appl. No. 15/167,555, filed May 27, 2016, Sawai.
U.S. Appl. No. 15/246,203, filed Aug. 24, 2016, Sawai et al.
U.S. Appl. No. 15/270,049, filed Sep. 20, 2016 Takano et al.
U.S. Appl. No. 15/332,397, filed Oct. 24, 2016, Takano.
U.S. Appl. No. 15/367,035, filed Dec. 1, 2016, Sawai et al.
U.S. Appl. No. 15/458,056, filed Mar. 14, 2017, Kimura et al.
U.S. Appl. No. 15/688,081, filed Aug. 28, 2017, Sawai et al.
U.S. Appl. No. 15/703,247, filed Sep. 13, 2017, Sawai et al.
U.S. Appl. No. 15/730,430, filed Oct. 11, 2017 Takano et al.
U.S. Appl. No. 15/789,377, filed Oct. 20, 2017, Takano et al.
U.S. Appl. No. 15/913,031, filed Mar. 6, 2018, Takano.
International Search Report and Written Opinion and English translation thereof dated Aug. 13, 2013 in connection with Application No. PCT/JP2013/068068.
International Preliminary Report on Patentability and English translation thereof dated Mar. 13, 2015 in connection with Application No. PCT/JP2013/068068.
Extended European Search Report dated Apr. 20, 2016 in connection with European Application No. 13833795.1.
Chinese Office Action dated Sep. 25, 2017 in connection with Chinese Application No. 201380044218.0 and English translation thereof.

* cited by examiner

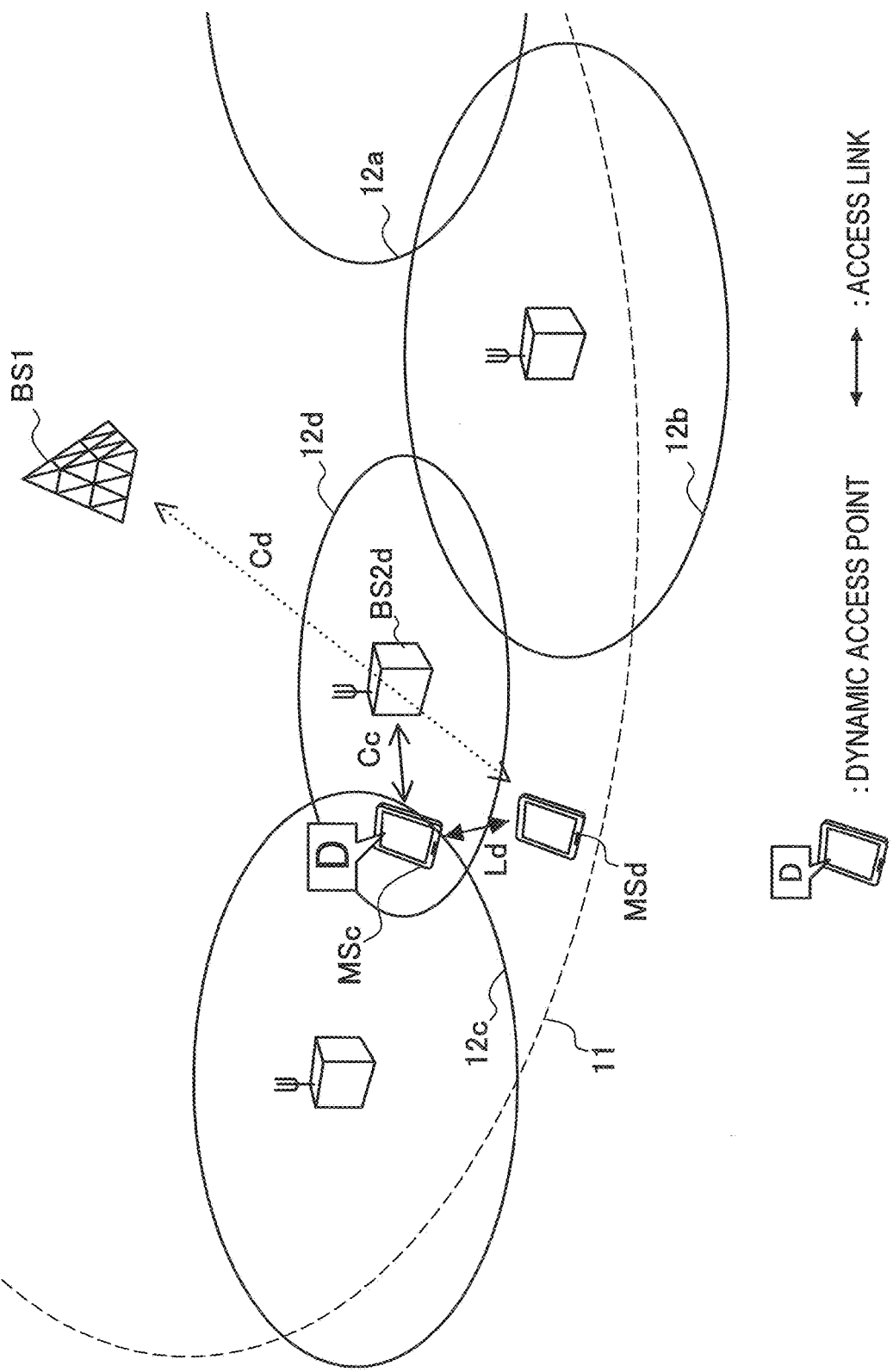

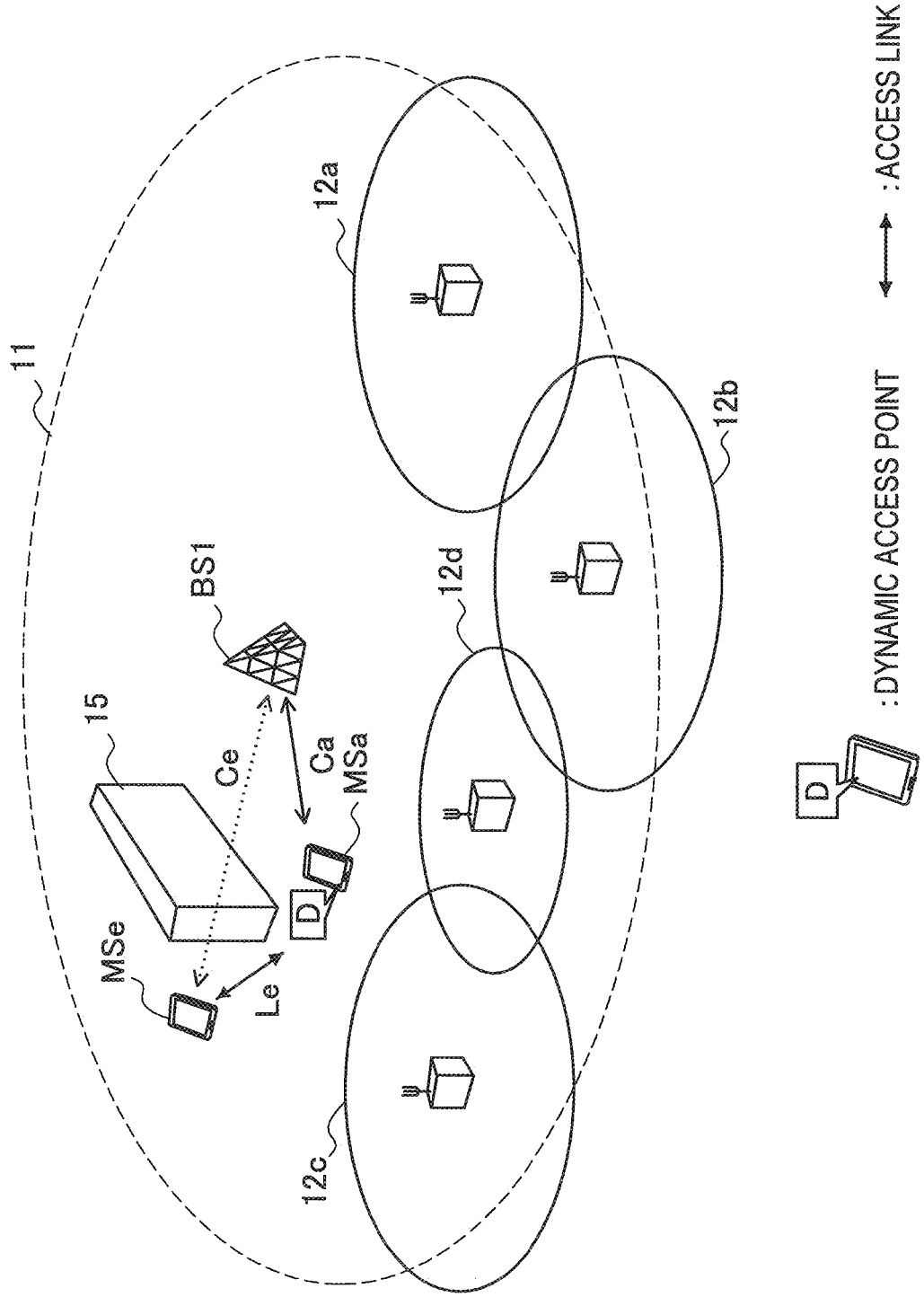

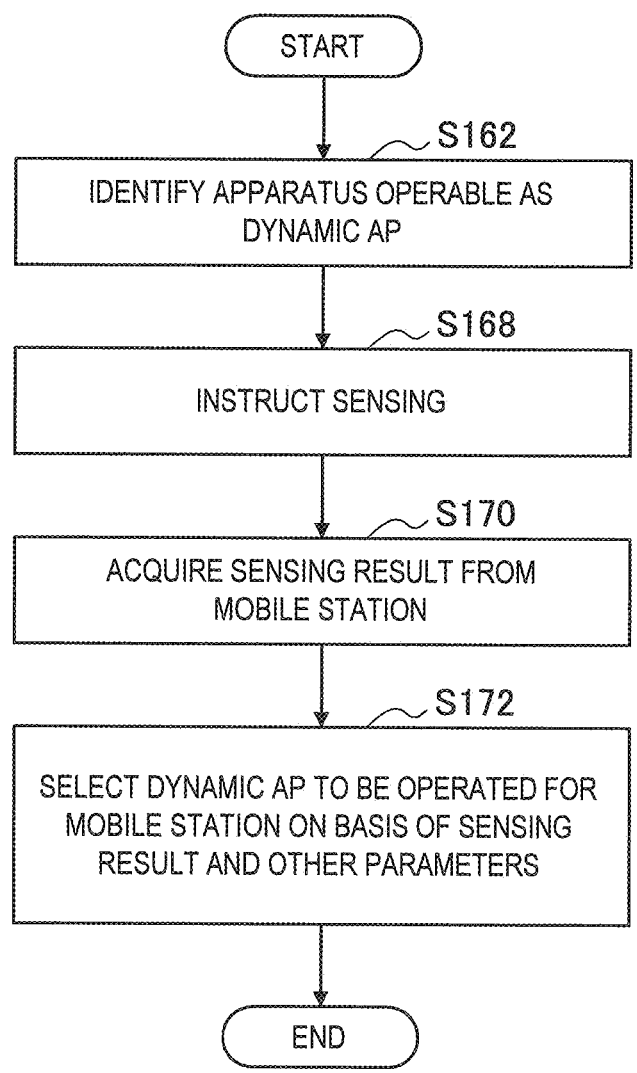

COMMUNICATION CONTROL APPARATUS, TERMINAL APPARATUS, COMMUNICATION CONTROL METHOD, PROGRAM, AND COMMUNICATION CONTROL SYSTEM

CROSS REFERENCE TO RELATED APPLICATIONS

This application is a continuation of U.S. patent application Ser. No. 14/422,811, filed on Feb. 20, 2015, now U.S. Pat. No. 9,998,985, which is a national stage entry filed under 35 U.S.C. § 371 of PCT Application No. PCT/JP2013/068068, filed Jul. 1, 2013, which claims priority to Japanese Patent Application JP 2012-191286, filed Aug. 31, 2012.

TECHNICAL FIELD

The present disclosure relates to a communication control apparatus, a terminal apparatus, a communication control method, a program, and a communication control system.

BACKGROUND ART

A recent radio communication environment has been facing the problem of depletion of frequency resources due to a rapid increase in data traffic. Accordingly, as one of measures against the depletion of the frequency resources, a heterogeneous network has been attracting attention. The heterogeneous network is a network that is formed by allowing various cells different in a radio access technology, a cell size or a frequency band to coexist. For example, there is proposed that, for the fifth-generation (5G) radio communication system after the 3GPP Release 12, a relatively low frequency band is allocated to a macro cell and a relatively high frequency band is allocated to a small cell to allow the macro cell and the small cell to be overlapped with each other (see Non-Patent Literature 1 below). Accordingly, network density can be enhanced and use efficiency of the frequency resources can be improved.

CITATION LIST

Non-Patent Literature

Non-Patent Literature 1: NTT DOCOMO, INC., "Requirements, Candidate Solutions & Technology Roadmap for LTE Rel-12 Onward", 3GPP Workshop on Release 12 and onwards, Ljubljana, Slovenia, Jun. 11-12, 2012

SUMMARY OF INVENTION

Technical Problem

However, large economical costs are required for arranging the cells. Therefore, it cannot be expected into the future that everywhere a mobile station can be located is involved in coverages of a number of the cells. In practice, there would be a case where the mobile station can be connected to the various cells, or there would be a case where it can be connected to the single cell or no connectable cells exist, depending on a place and a time.

Therefore, under the heterogeneous network environment, it is desirable that a system enabling flexible radio networking according to a situation of the mobile station is provided.

Solution to Problem

According to the present disclosure, there is provided a communication control apparatus including a determination unit that, when a mobile station communicates with any of one or more cells, determines whether the mobile station should communicate via an access point, a selection unit that, when it is determined that the mobile station should communicate via the access point, selects an apparatus that operates as the access point for the mobile station, and a signaling unit that instructs the apparatus selected by the selection unit to operate as the access point, and instructs the mobile station to communicate via the apparatus.

According to the present disclosure, there is provided a terminal apparatus including a radio communication unit capable of operating as an access point, and a communication control unit that exchanges signaling between the communication control unit and a control node that determines whether a mobile station should communicate via the access point when the mobile station communicates with any of one or more cells. The communication control unit, when being instructed to operate as the access point from the control node, allows the radio communication unit to operate as the access point.

According to the present disclosure, there is provided a communication control method including in a control node that controls formation of a radio network within one or more cells, determining whether a mobile station should communicate via an access point when the mobile station communicates with any of the one or more cells, selecting an apparatus that operates as the access point for the mobile station when it is determined that the mobile station should communicate via the access point, instructing the selected apparatus to operate as the access point, and instructing the mobile station to communicate via the selected apparatus.

According to the present disclosure, there is provided a program for causing a computer of a control node that controls formation of a radio network within one or more cells to function as a determination unit that determines whether a mobile station should communicate via an access point when the mobile station communicates with any of the one or more cells, a selection unit that selects an apparatus that operates as the access point for the mobile station when it is determined that the mobile station should communicate via the access point, and a signaling unit that instructs the apparatus selected by the selection unit to operate as the access point, and instructs the mobile station to communicate via the apparatus.

According to the present disclosure, there is provided a communication control system including one or more terminal apparatuses capable of operating as an access point, and a communication control apparatus including a determination unit that determines whether a mobile station should communicate via the access point when the mobile station communicates with any of one or more cells, a selection unit that selects an apparatus that operates as the access point for the mobile station from the one or more terminal apparatuses when it is determined that the mobile station should communicate via the access point, and a signaling unit that instructs the terminal apparatus selected by the selection unit to operate as the access point, and instructs the mobile station to communicate via the terminal apparatus.

Advantageous Effects of Invention

According to the present disclosure, under a heterogeneous network environment, a flexible radio networking according to a situation of a mobile station becomes possible.

BRIEF DESCRIPTION OF DRAWINGS

FIG. 3A is an explanatory diagram for explaining a first example of utilization of a dynamic access point.

FIG. 3B is an explanatory diagram for explaining a second example of utilization of a dynamic access point.

FIG. 7B is a flow chart illustrating a second example of a detailed flow of the access point selection processing shown in FIG. 5.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the following order.
1. Outline of technology
1-1. Example of heterogeneous network
1-2. Explanation of problems
2. Configuration of networking control node
2-1. Configuration sample of apparatus
2-2. Example of processing flow
3. Configuration of dynamic AP
3-1. Configuration example of apparatus
3-2. Example of processing flow
4. Overall processing sequence
5. Summary

1. Outline of Technology

First, an outline of a technology according to the present disclosure will be discussed using FIG. 1 to FIG. 3C.

[1-1. Example of Heterogeneous Network]

Figure 1:
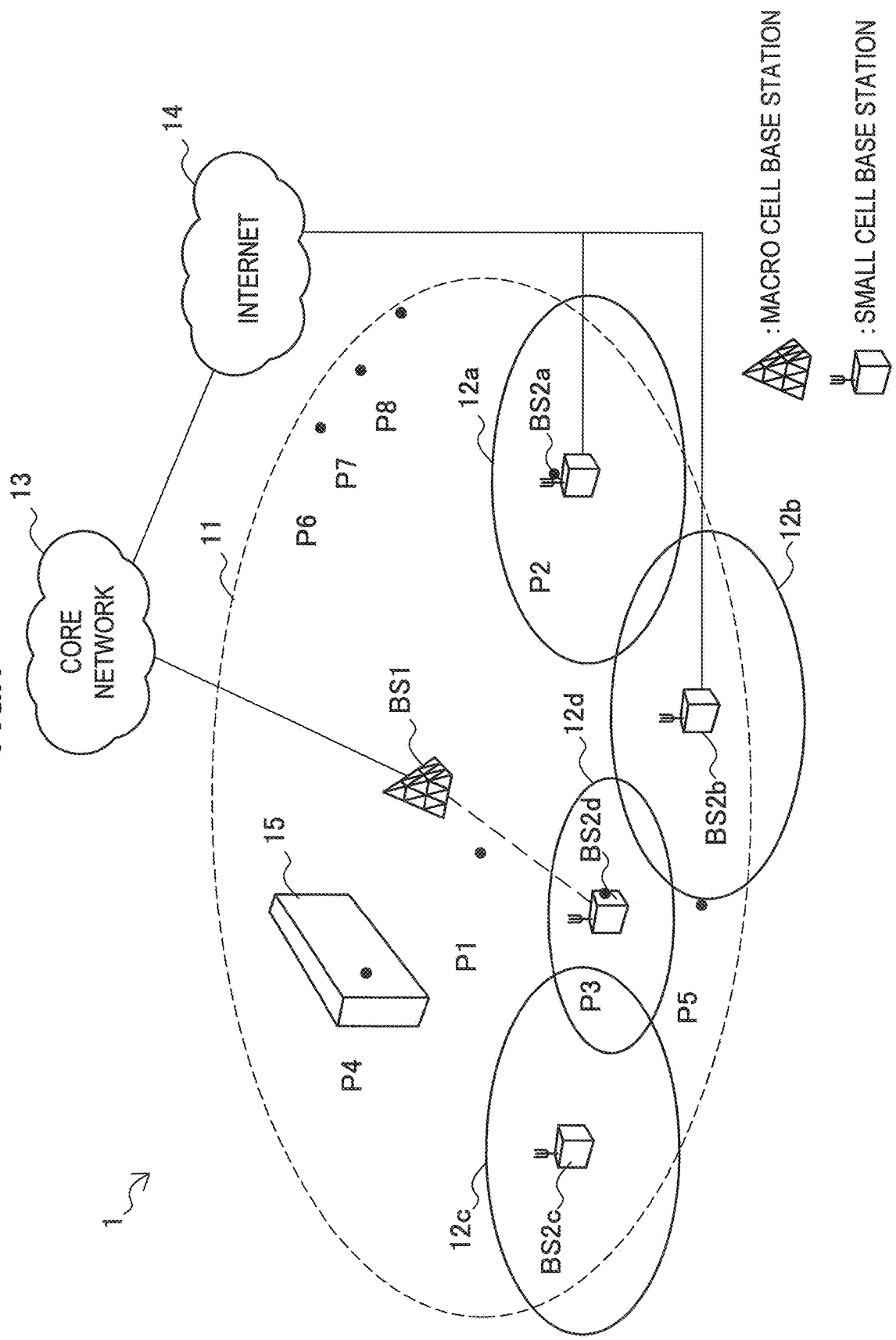
FIG. 1 is an explanatory diagram for explaining one example of a configuration of a heterogeneous network.

FIG. 1 is an explanatory diagram for explaining one example of a configuration of a heterogeneous network. With reference to FIG. 1, a heterogeneous network 1 as one example is illustrated. The heterogeneous network 1 includes a macro cell 11, and small cells 12a-12d. The macro cell 11 and the small cells 12a-12d are partially overlapped with each other.

The macro cell 11 is a large-sized cell operated by a base station BS1. As one sample, a radius of the macro cell 11 may be in a range from hundreds of meters to tens of kilometers. When the base station BS1 operates according to a long term evolution (LTE) system, the base station BS1 can be called an evolved node B (eNB). Note that the base station BS1 is not limited to such an example, and may operate according to other cellular communication systems such as an LTE-advanced (LTE-A) system, a WiMAX system or a wideband-code division multiple access (W-CDMA) system. The base station BS1 is connected to a core network 13. The core network is connected to the Internet 14.

A small cell is a small-sized cell compared with the macro cell. A small cell 12a is operated by a base station BS2a. A small cell 12b is operated by a base station BS2b. A small cell 12c is operated by a base station BS2c. A small cell 12d is operated by a base station BS2d. The small cell herein means a concept including various kinds of relatively small cells such as a femto cell, a nano cell, a pico cell and a micro cell. Classification of the small cells as one sample is shown in Table 1. Note that the technology according to the present disclosure can be also applied to types of cells not shown in Table 1.

TABLE 1

Classification of small cells

| Category | IF sample | MS receiving rate | Access type |
| --- | --- | --- | --- |
| Pico cell | S1, X2 | High | Open |
| Femto cell | X2 tunneling | Middle | Open/Closed |
| RRH | Optical fiber | High | Open |
| Hot zone | S1, X2 | High | Open |
| Relay station | Air IF | High | Open |

In Table 1, the "category" shows a small cell itself or a type of a small cell base station. The "IF sample" shows an example of a communication interface (or a communication medium) usable by the small cell base station to communicate with a macro cell station or other control nodes. The pico cell can communicate, for example, with a control node within a core network via the S1 interface, and with other base stations via the X2 interface. The femto cell can communicate with other base stations by using the X2 tunneling protocol. The remote radio head (RRH) can communicate with the macro cell base station via the optical fiber. Similarly to the pico cell, the hot zone base station can communicate with the control node within the core network via the S1 interface, and with other base stations via the X2 interface. The relay station can communicate with the macro cell base station via the air interface. The "MS receiving rate" is an index indicating how many mobile stations (corresponding to UEs in the LTE system) one cell can receive. The MS receiving rate of the femto cell is slightly lower compared with those of the pico cell, the RRH, the hot zone base station and the relay station. The "access type" is classification relating to acceptance of access from the mobile station. All of the mobile stations can be connected to the cells of the open access type in principle, while the only previously-registered mobile stations can be connected to the cells of the closed access type in principle.

[1-2. Explanation of Problems]

In the heterogeneous network 1 exemplified in FIG. 1, which of the cells the respective mobile stations can be connected to is dependent upon points where the mobile stations exist. For example, a point P1 and points P4-P8 are included in the macro cell 11, while a point P2 is included in the macro cell 11 and the small cell 12a. A point P3 is included in the macro cell 11, the small cell 12c and the small cell 12d. When the mobile stations located at these points are connected to the cells having best communication quality, respectively, the radio connection as shown in FIG. 2 can be formed.

Figure 2:
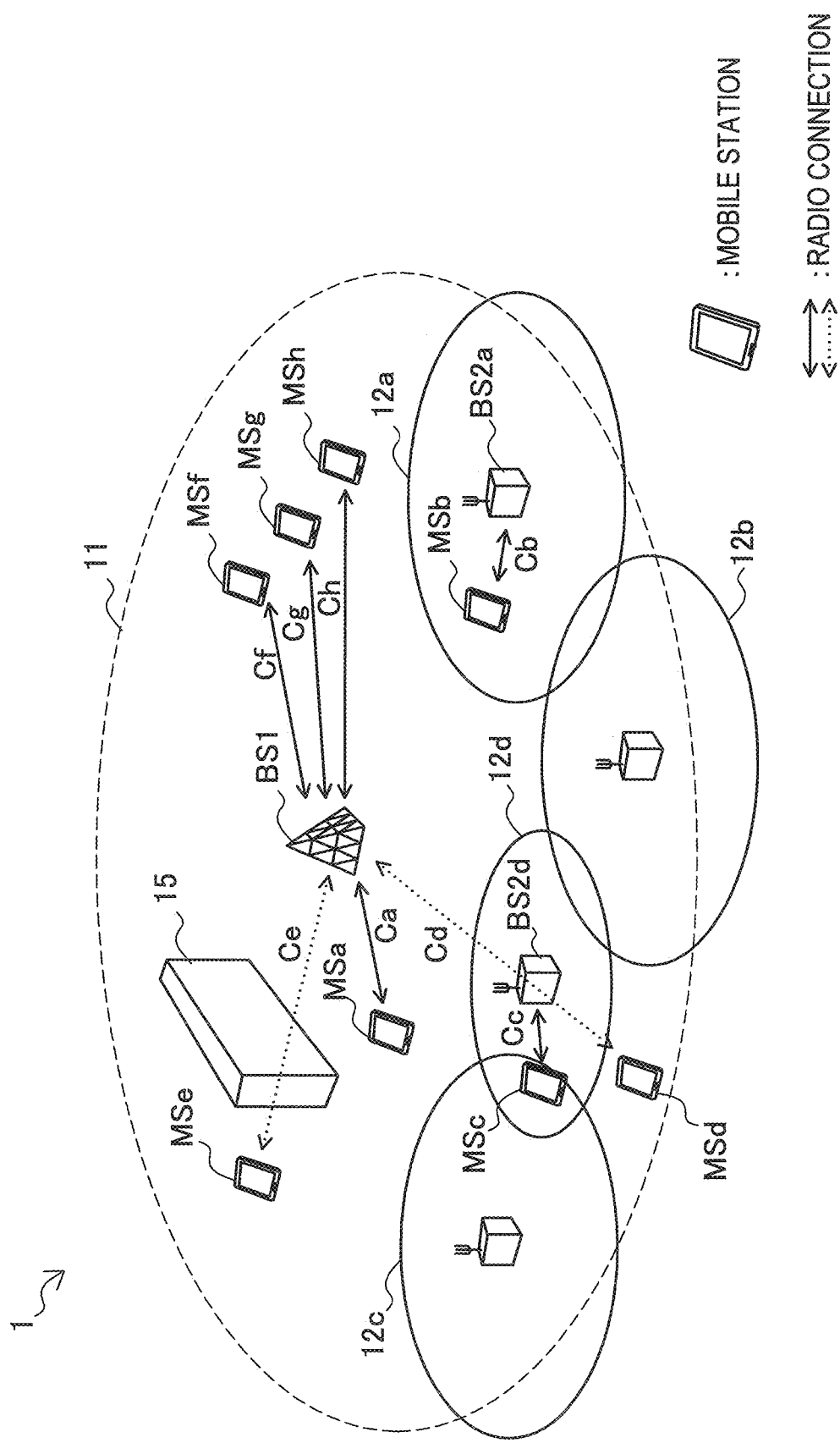
FIG. 2 is an explanatory diagram for explaining examples of various radio connections formed in the heterogeneous network.

In an example of FIG. 2, a mobile station MSa forms a radio connection Ca between itself and the base station BS1 of the macro cell 11. A mobile station MSb forms a radio connection Cb between itself and the base station BS2a of the small cell 12a. A mobile station MSc forms a radio connection Cc between itself and the base station BS2d of the small cell 12d. Mobile stations MSd, MSe, MSf, MSg and MSh form radio connections Cd, Ce, Cf, Cg and Ch between themselves and the base station BS1 of the macro cell 11, respectively.

In the connection relationship exemplified in FIG. 2, although it seems that the respective mobile stations select optimum connection-destination cells, some disadvantages that can have adverse effects on system capacity or service quality have been actually generated. For example, since the mobile station MSd is located around the cell edge of the macro cell 11, the mobile station MSd is likely to obtain only poor communication quality even if it is connected to the macro cell 11. Although the base station BS2d of the small cell 12d is located closer to the mobile station MSd than the base station BS1 of the macro cell 11, since the small cell 12d has a radius shorter than that of the macro cell 11, the mobile station MSd cannot be directly connected to the small cell 12d. A transmission signal from the mobile station MSd is likely to cause harmful interference with a signal received within the small cell 12d. Further, for example, since the mobile station MSe is located behind an obstacle 15, the mobile station MSe is likely to obtain only poor communication quality, even if it is connected to the macro cell 11. Moreover, for example, the mobile stations MSf, MSg and MSh are located adjacent to each other. Therefore, it is difficult to spatially separate these mobile stations by beam forming or antenna directional control. Further, transmission signals from the mobile stations MSf, MSg and MSh are also likely to have harmful interference with a signal received within the small cell 12a.

In order to overcome such disadvantageous situations, the technology according to the present disclosure utilizes a terminal apparatus operable as an access point (AP), that is, a dynamic AP. Classification of the dynamic APs as one example is shown in Table 2. Note that the technology according to the present disclosure can be also applied to dynamic APs not shown in Table 2.

TABLE 2

Classification of dynamic access points (AP)

| Category | IF example | AP function | Battery | MS receiving rate | Access type |
|---|---|---|---|---|---|
| Mobile router terminal | Air IF | Unique | Large | Low | Open/closed |
| General terminal | Air IF | Download | Small | Low | Open/closed |

In Table 2, the "category" shows a type of the dynamic AP. The "IF example" shows an example of a communication interface usable by the dynamic AP to communicate with the base station or other control nodes. Both of the mobile router terminal and the general terminal can communicate with the base station via the air interface. The air interface herein may be a radio interface of a cellular system provided by the macro cell or the small cell. Instead, the dynamic AP may communicate with the base station via the air interface (and a wired network beyond the air interface) of a non-cellular system such as a wireless LAN, Bluetooth (registered trademark), or Zigbee. The "AP function" shows how to realize a function for operating as the access point. The mobile router terminal is a terminal previously mounting a unique access point function. The general terminal is a terminal operable as the access point by downloading a function module for the access point function in an ex-post manner. The "battery" shows an average size of battery capacity of the terminal. The battery capacity of the mobile router terminal is often greater than that of the general terminal. The "MS receiving rate" is an index showing how many base stations one AP can receive. Compared with the various base stations described above, typically, the MS receiving rate of the dynamic AP is low. The "access type" is classification relating to acceptance of access from the mobile station. The access type of the dynamic AP may be the open access type, or may be the closed access type.

FIG. 3A is an explanatory diagram for explaining a first example of utilization of the dynamic AP. With reference to FIG. 3A, the enlarged one portion of the heterogeneous network 1 shown in FIG. 2 is illustrated. Here, the mobile station MSc is connected to the small cell 12d, and operates as the access point. The mobile station MSd is connected to the mobile station MSc to form an access link Ld (also referred to as a localized network), and indirectly communicates with the base station BS2d of the small cell 12d. As a result, the mobile station MSd can obtain successful communication quality. Moreover, there is also avoided the problem that the transmission signal from the mobile station MSd has harmful interference with the signal received within the small cell 12d.

FIG. 3B is an explanatory diagram for explaining a second example of utilization of the dynamic AP. With reference to FIG. 3B, the heterogeneous network 1 shown in FIG. 2 is illustrated again. Here, the mobile station MSa is connected to the macro cell 11, and operates as the access point. The mobile station MSe is connected to the mobile station MSa to form an access link Le (also referred to as a localized network), and indirectly communicates with the base station BS1 of the macro cell 11. As a result, the mobile station MSe can obtain successful communication quality.

Figure 3C:
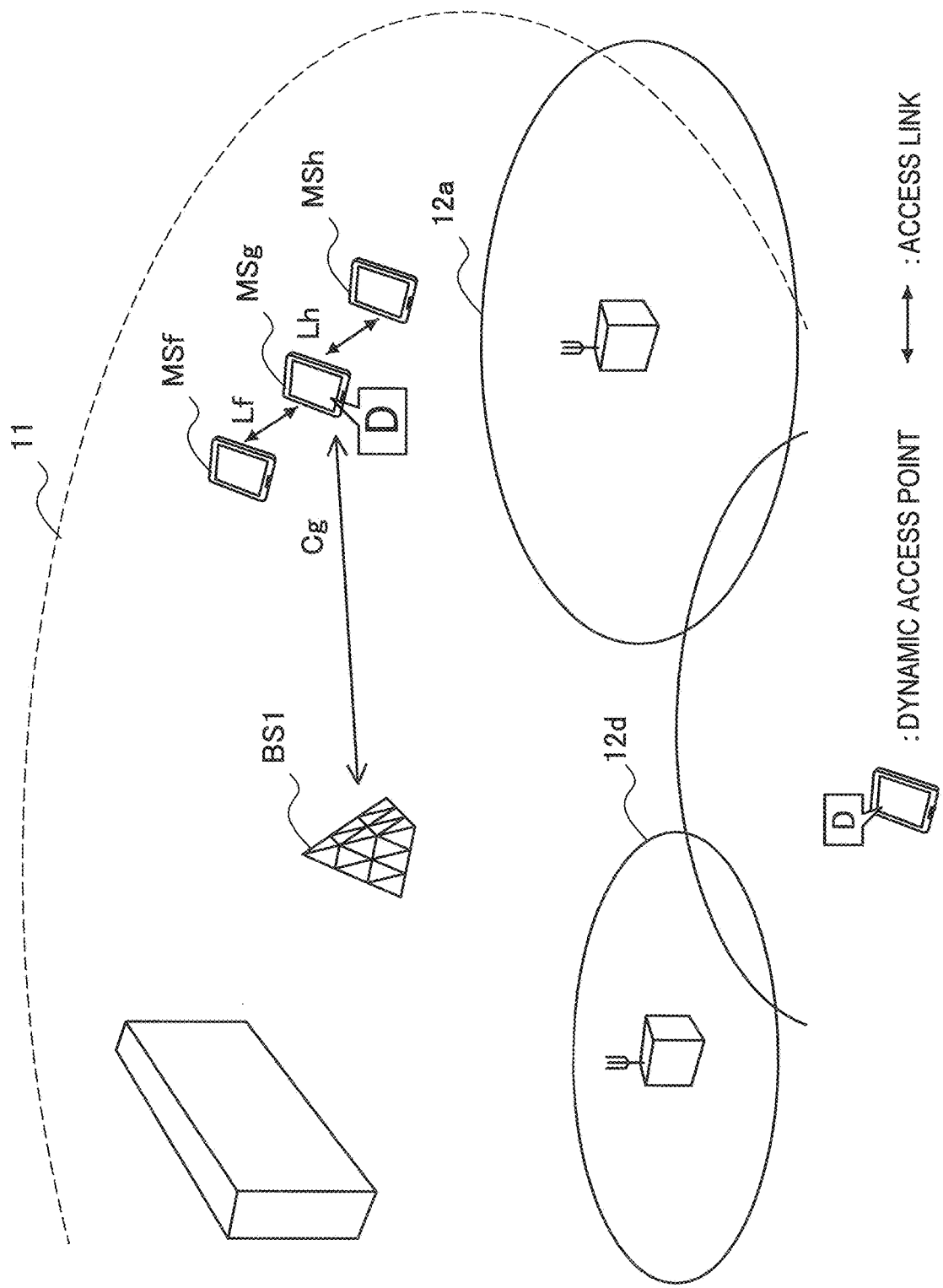
FIG. 3C is an explanatory diagram for explaining a third example of utilization of a dynamic access point.

FIG. 3C is an explanatory diagram for explaining a third example of utilization of the dynamic AP. With reference to FIG. 3C, the enlarged one portion of the heterogeneous network 1 shown in FIG. 2 is illustrated. Here, the mobile station MSg is connected to the macro cell 11, and operates as the access point. The mobile station MSf is connected to the mobile station MSg to form an access link Lf, and indirectly communicates with the base station BS1 of the macro cell 11. The mobile station MSh is also connected to the mobile station MSg to form an access link Lh, and indirectly communicates with the base station BS1 of the macro cell 11. Since, when the mobile station MSg is a reference, the mobile stations MSf and MSh are located on sides opposite to each other, it is easy to spatially separate these mobile stations by the beam forming or the antenna directional control. Since distances between the mobile station MSg and the mobile stations MSf and MSh are short, there is also avoided the problem that the transmission signals from the mobile stations MSf and MSh have harmful interference with the signal received within the small cell 12a.

In this manner, there are many advantages in terms of system capacity or service quality in utilization of the dynamic AP under the heterogeneous network environment. However, since the formation of the optimal localized network demands understanding of a topology of the network and capability of the respective apparatuses, this is not easy for the respective mobile stations. Therefore, the technology according to the present disclosure introduces a networking control entity (NCE) as a novel function entity for supporting the formation of the localized network described above. The networking control entity, when the mobile station performs radio communication, determines the necessity of communication via the access point in addition to determination of the cell to be connected by the mobile station. Moreover, the networking control entity, when determining that the communication via the access point is necessary, coordinates such communication. A node mounting the networking control entity is referred herein to as a networking control node. In the next section, there will be discussed a configuration of the networking control node.

2. Configuration of Networking Control Node

The networking control node may be mounted in any communication node. In terms of accessibility from the mobile station, it is advantageous that the networking control node is mounted as one function of the base station, the control node on the core network, or a server on the Internet. In this section, as one example, the networking control node is mounted on the control node (for example, a mobility management entity (MME), a serving gateway (S-GW) or a PDN gateway (P-GW), or a dedicated node for the NCE) on the core network 13.

[2-1. Configuration Example of Apparatus]

Figure 4:
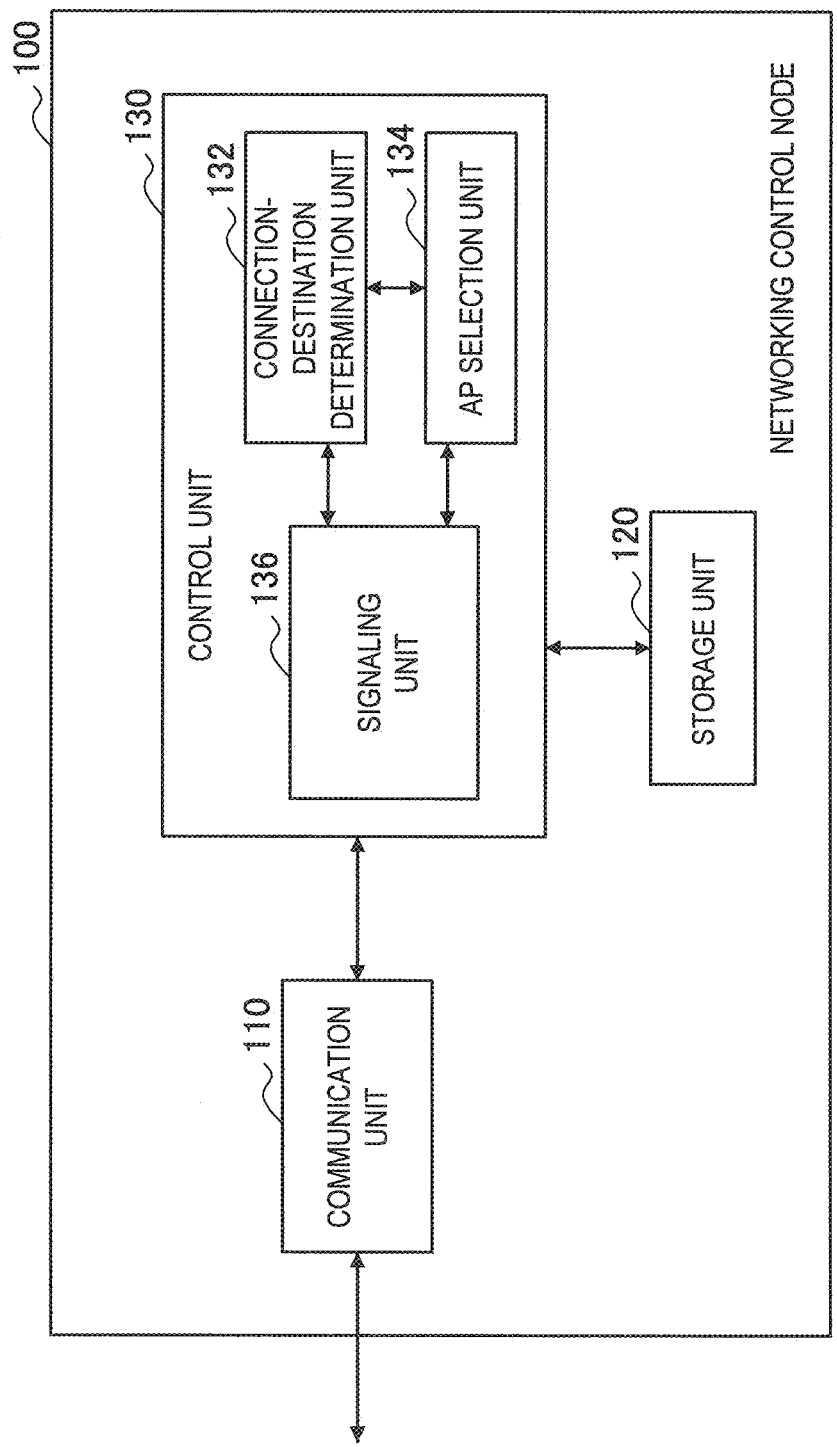
FIG. 4 is a block diagram illustrating one example of a configuration of a networking control node according to an embodiment.

FIG. 4 is a block diagram illustrating one example of a configuration of a networking control node 100 according to an embodiment. With reference to FIG. 4, the networking control node 100 includes a communication unit 110, a storage unit 120, and a control unit 130.

(1) Communication Unit

The communication unit 110 is a communication interface allowing the networking control node 100 to communicate with other apparatuses. The communication unit 110 communicates with, for example, the various base stations connected to the core network 13 or the Internet 14. Further, the communication unit 110 communicates with the mobile station via these base stations.

(2) Storage Unit

The storage unit 120 stores a program and data for operation of the networking control node 100 by using a storage medium such as a hard disk or a semiconductor memory. The data stored by the storage unit 120 can include information on the cell, information on the mobile station and the dynamic AP, and a measurement result of communication quality, which will be discussed later.

(3) Control Unit

The control unit 130 controls overall operations of the networking control node 100 by using a processor such as a central processing unit (CPU) or a digital signal processor (DSP). In this embodiment, the control unit 130 includes a connection-destination determination unit 132, an AP selection unit 134, and a signaling unit 136.

(3-1) Connection-Destination Determination Unit

The connection-destination determination unit 132 determines the cell to be communicated with the mobile station among the one or more cells that can include the macro cell and the small cell, when the mobile station performs radio communication. More specifically, the connection-destination determination unit 132 determines the cell to be communicated with the mobile station (that is, the connection-destination cell) according to a predetermined determination criterion. The determination criterion here may be a criterion relating to at least one of communication quality, a traffic load and power consumption efficiency. For example, the connection-destination determination unit 132 may determine, as the connection-destination cell, the cell in which the best communication quality (latency, a bit rate, throughput, reception signal intensity, a signal-to-noise ratio (SNR) or a signal-to-interference noise ratio (SINR), or the like) can be expected. The SNR can be calculated from a noise floor of the cell, and the reception signal intensity for the cell. The SINR can be calculated by further adding an interference level from the adjacent cell to the calculation of the SNR. Further, the connection-destination determination unit 132 may determine, as the connection-destination cell, the cell in which communication quality sufficient to fulfill a requirement of service quality (QoS) for each mobile station can be expected. Further, the connection-destination determination unit 132 may determine, as the connection-destination cell, the cell that uses a frequency band having a wide bandwidth, for dispersing a load. Further, the connection-destination determination unit 132 may determine, as the connection-destination cell, the cell having the best power consumption efficiency, for contributing to energy saving.

The connection-destination determination unit 132, when the only one cell satisfies the determination criterion, determines the cell as the connection-destination cell. On the other hand, the connection-destination determination unit 132, when the plurality of cells satisfy the determination criterion, may determine, as the connection-destination cell, for example, the cell having the least traffic load at that time. The load for each cell can be calculated, for example, according to a simple calculation formula of $L_i=W_i/N_i$ where $W_i$ is a bandwidth of a frequency band of the i-th cell, and $N_i$ is the number of mobile stations being connected. In this case, the cell representing the largest value of $L_i$ is the cell having the lowest load.

Moreover, the connection-destination determination unit 132, when no cells satisfy the determination criterion, that is, when no cells of the respective cells with which the mobile station directly communicates satisfy the determination criterion, determines that the mobile station should communicate via the access point. In this case, the connection-destination determination unit 132 instructs the AP selection unit 134 to select the access point to be operated for the mobile station.

(3-2) AP Selection Unit

The AP selection unit 134, when the connection-destination determination unit 132 determines that the mobile station should communicate via the access point, selects the apparatus to be operated as the access point for the mobile station. More specifically, the AP selection unit 134 specifies the dynamic AP that exists adjacent to the mobile station. Then, the AP selection unit 134, when the one or more dynamic APs exist adjacent thereto, selects the dynamic AP to be operated as the AP for the mobile station, from these dynamic APs as a candidate.

As a first method, the AP selection unit 134 may select the AP for the mobile station on the basis of a position of the adjacent dynamic AP. The position of the dynamic AP may be measured by each dynamic AP and reported to the networking control node 100. Instead, the base station or other apparatuses may measure the position of the dynamic AP. A method for measuring the position may be a global positioning system-based positioning method, or a method based on signal intensity, quality or an incoming time difference of a radio signal, or the like. The AP selection unit 134 may select, for example, the AP having the best communication quality between itself and the base station among the dynamic APs adjacent to the mobile station. Accordingly, as is described using FIG. 3A and FIG. 3B, there can be achieved improvement in communication quality and prevention of interference in the mobile station. Further, the AP selection unit 134, when the plurality of dynamic APs exist within a certain limited region, may select the dynamic AP located closer to the center of the region. Accordingly, as is described using FIG. 3C, there can be achieved spatial separation and prevention of interference in the mobile station. Note that the AP selection unit 134 may select the dynamic AP according to a more complicated geographic condition, such as the dynamic AP located at a higher altitude, or the dynamic AP securing a line of sight from more mobile stations.

When the plurality of dynamic APs suitable to be selected exist, the AP selection unit 134 can select the one dynamic AP on the basis of at least one parameter of performance, mobility, a remaining battery level and availability of a communication link of each dynamic AP. For example, when the AP relaying the traffic largely moves, communication by the mobile station is adversely affected. Therefore, the AP selection unit 134 may select the dynamic AP having lower mobility. Note that the mobility can be determined by monitoring a temporal change in position of each dynamic AP. Moreover, the AP selection unit 134 may select the dynamic AP being the highest in performance of hardware such as a processor, a memory or an RF circuit, or communication performance. The communication performance here includes performance for communication between each dynamic AP, and the connection-destination cell and the networking control node 100, and can be determined on the basis of a guaranteed QoS level, or the like. The QoS level may be determined only for the air interface used by each dynamic AP, or may be determined for end-to-end communication that can include the air interface and the wired network. Moreover, the AP selection unit 134 may select the dynamic AP having the highest remaining battery level (or being connected to a fixed power supply). Further, the AP selection unit 134 may select the dynamic AP having a wired backhaul link. These selection conditions may be combined in any manner.

As a second method, the AP selection unit 134 may select the AP for the mobile station on the basis of quality measured in the mobile station for the radio signal transmitted from the dynamic AP adjacent to the mobile station. In this case, the AP selection unit 134 may notice the dynamic AP and the mobile station via the signaling unit 136 of parameters such as timing, a period, a frequency band and a device ID for the quality measurement. The notification to the dynamic AP may be shared with uplink permission (UL grant) for uplink transmission from the dynamic AP operating as the MS. The AP selection unit 134 may save resources required for the quality measurement by allowing the plurality of mobile stations to simultaneously execute the quality measurement. The mobile station reports to the networking node 100 the measurement result including the measurements and the device ID for each dynamic AP. The AP selection unit 134 selects the optimum dynamic AP on the basis of the reported measurement result. The AP selection unit 134 may select, for example, the dynamic AP having the best quality measured by a certain mobile station, for the mobile station. Accordingly, as is described using FIG. 3A and FIG. 3B, there can be achieved improvement in communication quality in the mobile station. Further, the AP selection unit 134 may select the dynamic AP having the best quality as a total of quality measured by the plurality of mobile stations (probably, the dynamic AP being geographically located at the center of the plurality of mobile stations). Accordingly, as is described using FIG. 3C, there can be achieved spatial separation and prevention of interference in the mobile station. Also in the second method, when the plurality of dynamic APs suitable to be selected exist, the AP selection unit 134 may select any one dynamic AP on the basis of at least one parameter of the performance, the mobility, the remaining battery level and the availability of the communication link of each dynamic AP.

As a third method, the AP selection unit 134 may select the dynamic AP specified on the basis of the measurement result of the communication quality by the mobile station, as the AP for the mobile station. The measurement of the communication quality by the mobile station can be performed similarly to the second method. In the third method, the mobile station specifies the optimum dynamic AP for its own mobile station on the basis of the measurement result of the communication quality. Then, the mobile station reports the device ID of the specified dynamic AP to the networking control node 100. The AP selection unit 134 determines whether to approve the specified dynamic AP in the report from the mobile station. The dynamic AP approved here is selected as the AP operating for the mobile station. The AP selection unit 134, when, for example, the MS receiving rate of the specified dynamic AP reaches a limit, need not approve the specified dynamic AP. Further, the AP selection unit 134, also when any other dynamic AP more suitable in terms of the topology of the whole network exists, need not approve the dynamic AP specified by the mobile station. When another dynamic AP recommended exists, the AP selection unit 134 can select another dynamic AP instead of the specified dynamic AP. In the third method, when the plurality of dynamic APs suitable to be selected exist, the AP selection unit 134 may select any one dynamic AP on the basis of at least one parameter of the performance, the mobility, the remaining battery level and the availability of the communication link of each dynamic AP.

Note that, in any method, the dynamic AP selected by the AP selection unit 134 may refuse the operation as the AP. In this case, the AP selection unit 134 can select again the AP operating for the mobile station from the remaining dynamic APs.

(3-3) Signaling Unit

The signaling unit 136 executes signaling between the networking control node 100 and other apparatuses. The signaling executed by the signaling unit 136 may be encrypted according to a secure protocol such as an IPsec. For example, the signaling unit 136 previously acquires information on the one or more cells within the heterogeneous network 1. The information on the cell can include, for example, a radio access technology, a cell ID, a position and a type of the base station, a cell size, a frequency band, an upper limit and a lower limit of transmission power, a minimum receiving sensitivity, an acceptable interference level, a noise figure, an IP address, and a supported secure protocol, and the like. Further, the signaling unit 136 acquires information on the mobile station. The signaling unit 136 may acquire the information on the mobile station from the mobile station itself, or may acquire the information on the mobile station from a subscriber information database on the core network 13. The information on the mobile station can include, for example, a device ID, a position, capability information (operability as the AP, and an MS receiving capacity when operable, and the like), and battery information, and the like.

Moreover, the signaling unit 136 recognizes a trigger for networking control. The trigger for the networking control may be the reception of a control request from, for example, the mobile station newly starting the radio communication or the mobile station experiencing poor communication quality. Further, the trigger may be the reception of a control request from the base station that desires improvement in throughput or suppression of a load. Further, the trigger may be the detection of a change in the network topology, the detection of movement, operation stop or battery shortage of the dynamic AP already operating as the access point, or the coming of periodical timing, or the like. When the trigger is recognized, the connection-destination determination processing by the connection-destination determination unit 132, and the AP selection processing by the AP selection unit 134 can be executed.

The signaling unit 136, when, in the result of the connection-destination determination processing, it is determined that the mobile station can communicate with any cell not via the access point, notices the mobile station of identification information of the determined connection-destination cell. As one example, in the LTE system, a cell group number and a cell number of a primary synchronization sequence (PSS) and a secondary synchronization sequence (SSS) can constitute the identification information of the cell. Instead, the identification information of the cell may be configured from other information such as, for example, an orthogonal code or a frequency pattern ID. The mobile station can be synchronized with the cell selected by the networking control node 100 to establish the radio connection by using such identification information. The signaling unit 136 may notice the mobile station of other information on the connection-destination cell (for example, a radio access technology and a frequency band, and the like).

Moreover, the signaling unit 136, when the AP selection processing is executed by the AP selection unit 134, instructs the dynamic AP selected by the AP selection unit 134 to operate as the access point. Further, the signaling unit 136 notices the dynamic AP of the identification information of the connection-destination cell. In response to the instruction from the signaling unit 136, the dynamic AP establishes the radio connection between itself and the connection-destination cell, and starts operating as the access point for the mobile station. The signaling unit 136 may instruct parameters to be used for relaying traffic by the dynamic AP (for example, a frequency band, timing, maximum transmission power, a radio access technology, a spectrum mask or an encryption scheme, or the like) to the selected dynamic AP. Further, the signaling unit 136 instructs the mobile station to communicate via the dynamic AP. The signaling unit 136 notices the mobile station of the identification information of the dynamic AP starting operating as the access point. Accordingly, the mobile station is connected to the connection-destination cell via the dynamic AP to form the localized network as described using FIG. 3A to FIG. 3C.

Note that, when the phantom cell described in Non-Patent Literature 1 described above is arranged, the signaling unit 136 need not notice the mobile station of the identification information of the connection-destination cell or the identification information of the dynamic AP.

[2-2. Example of Processing Flow]

(1) Overall Flow

Figure 5:
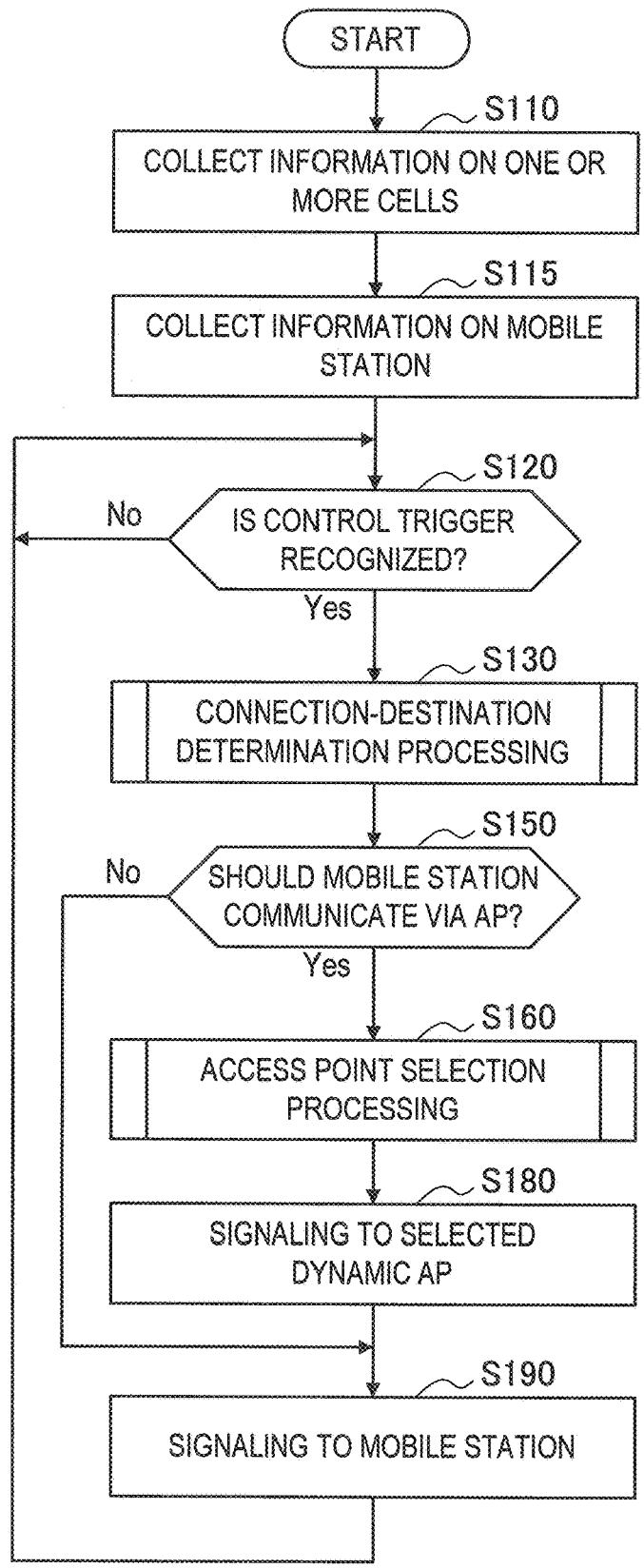
FIG. 5 is a flow chart illustrating one example of a processing flow that can be executed by the networking control node shown in FIG. 4.

FIG. 5 is a flow chart illustrating one example of a processing flow that can be executed by the networking control node 100. With reference to FIG. 5, first, the signaling unit 136 collects the information on the one or more cells within the heterogeneous network 1 (Step S110). Further, the signaling unit 136 collects the information on the mobile station (Step S115). Then, the signaling unit 136 waits for the trigger for the control (Step S120).

When the trigger for the control is recognized, the connection-destination determination unit 132 executes the connection-destination determination processing (Step S130). One example of a detailed flow of the connection-destination determination processing will be discussed in detail later. Next, the connection-destination determination unit 132 determines whether the mobile station should communicate via the access point (Step S150). Here, when it is determined that the mobile station should communicate via the access point, the AP selection unit 134 executes the access point selection processing (Step S160). Some examples of a detailed flow of the access point selection processing will be discussed in detail later. Then, the signaling unit 136 instructs the dynamic AP selected as a result of the AP selection processing to operate as the access point (Step S180). When the mobile station can directly communicate with the connection-destination cell, the processing at Step S160 and Step S180 can be skipped. Next, the signaling unit 136 performs signaling of the result of the connection-destination determination processing (and, if necessary, the result of the access point selection processing) to the mobile station (Step S190).

(2) Connection-Destination Determination Processing

Figure 6:
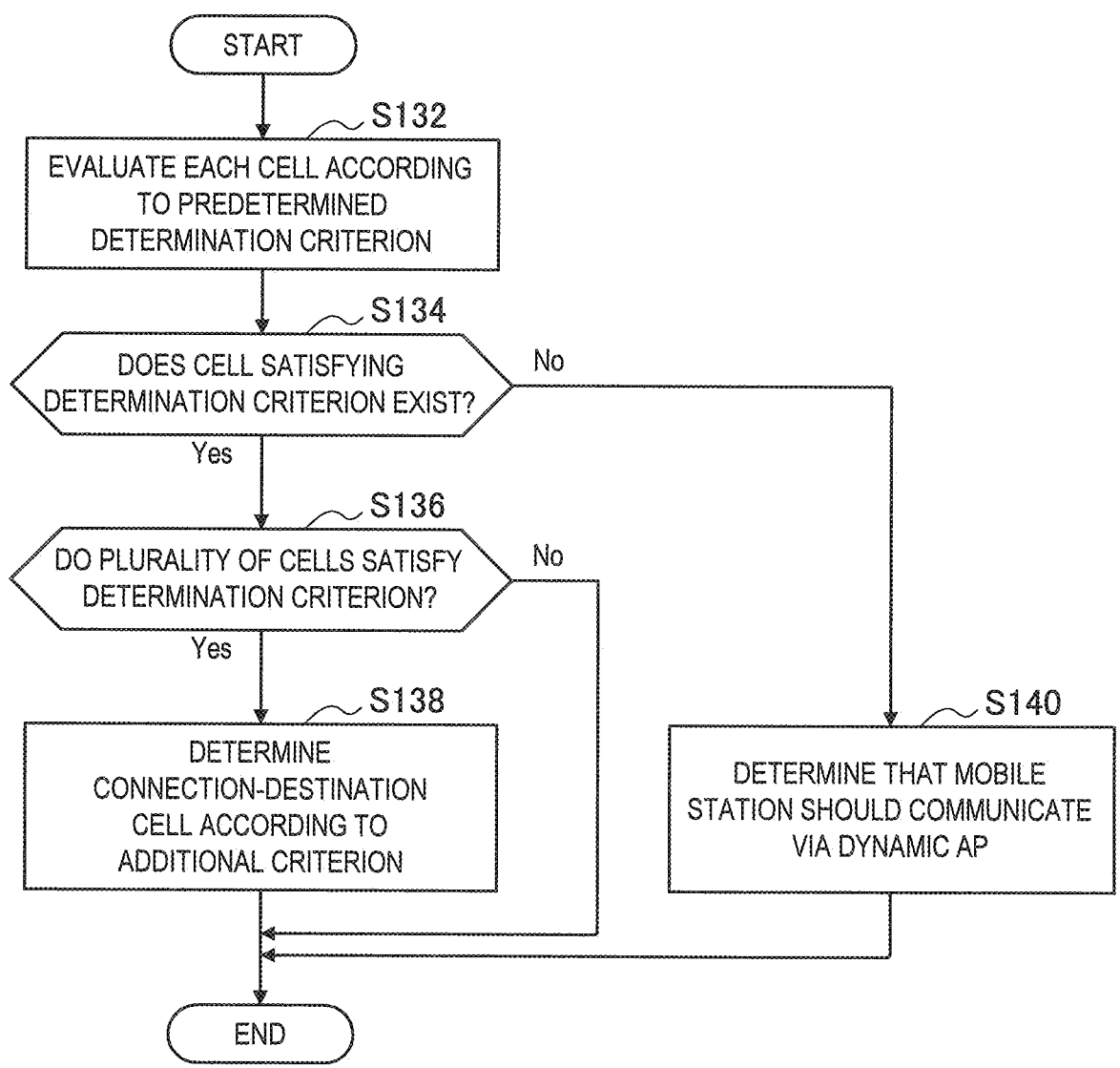
FIG. 6 is a flow chart illustrating one example of a detailed flow of the connection-destination determination processing shown in FIG. 5.

FIG. 6 is a flow chart illustrating one example of a detailed flow of the connection-destination determination processing shown in FIG. 5. With reference to FIG. 6, first, the connection-destination determination unit 132 evaluates each of the one or more cells according to the predetermined determination criterion. The determination criterion here, as described above, may be a criterion related to at least one of communication quality, a traffic load and power consumption efficiency. The subsequent processing is branched according to the number of cells satisfying the determination criterion. When no cells satisfying the determination criterion exist, the processing proceeds to Step S140 (Step S134). When the plurality of cells satisfying the determination criterion exist, the processing proceeds to Step S138 (Step S136). When only the one cell satisfying the determination criterion exists, the cell is determined as the connection-destination cell.

At Step S138, the connection-destination determination unit 132 determines the connection-destination cell from the plurality of cells satisfying the determination criterion at Step S132, according to an additional criterion (Step S138). The additional criterion may be a criterion related to the load for each cell described above, or the like.

At Step S140, the connection-destination determination unit 132 determines that the mobile station should communicate via the access point (Step S140). In this case, the mobile station is indirectly connected to the cell connected by the dynamic AP selected in the access point selection processing that will be discussed later.

(3) Access Point Selection Processing

Figure 7A:
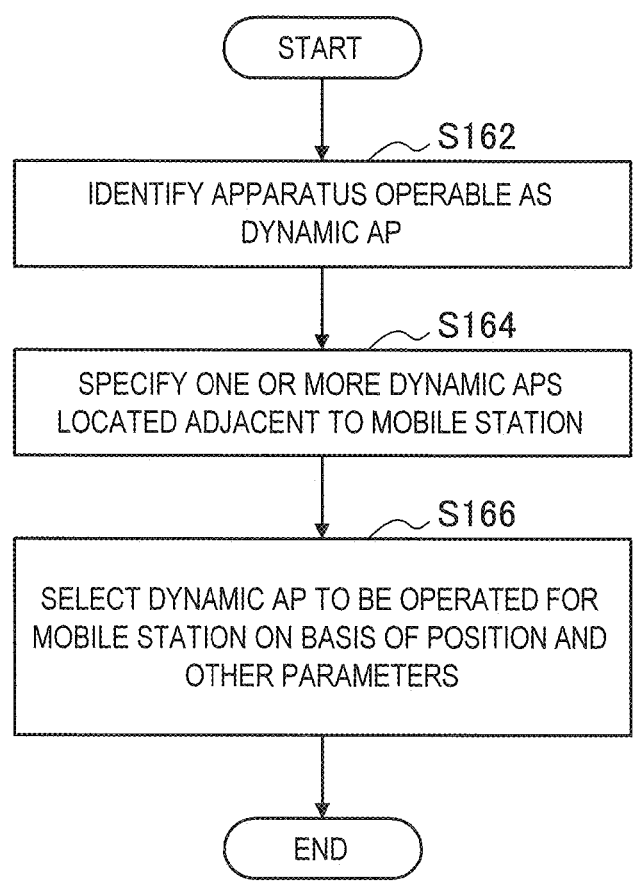
FIG. 7A is a flow chart illustrating a first example of a detailed flow of the access point selection processing shown in FIG. 5.

FIG. 7A is a flow chart illustrating a first example of a detailed flow of the access point selection processing shown in FIG. 5. With reference to FIG. 7A, first, the AP selection unit 134 identifies the apparatus operable as the dynamic AP by using, for example, the capability information of the mobile station (Step S162). Next, the AP selection unit 134 specifies the one or more dynamic APs located adjacent to the mobile station to be controlled (Step S164). Then, the AP selection unit 134 selects the dynamic AP to be operated for the mobile station on the basis of the position and other parameters (for example, performance, mobility, a remaining battery level and availability of a communication link, and the like) of the specified dynamic APs and the mobile station (Step S166).

FIG. 7B is a flow chart illustrating a second example of a detailed flow of the access point selection processing shown in FIG. 5. With reference to FIG. 7B, first, the AP selection unit 134 identifies the apparatus operable as the dynamic AP by using, for example, the capability information of the mobile station (Step S162). Next, the AP selection unit 134 instructs the mobile station to perform sensing of the radio signal transmitted from the dynamic AP, via the signaling unit 136 (Step S168). Next, the AP selection unit 134 acquires the sensing result reported from the mobile station, that is, the measurement result of the communication quality for each dynamic AP (Step S170). Then, the AP selection unit 134 selects the dynamic AP to be operated for the mobile station on the basis of the acquired sensing result and other parameters (Step S172).

Figure 7C:
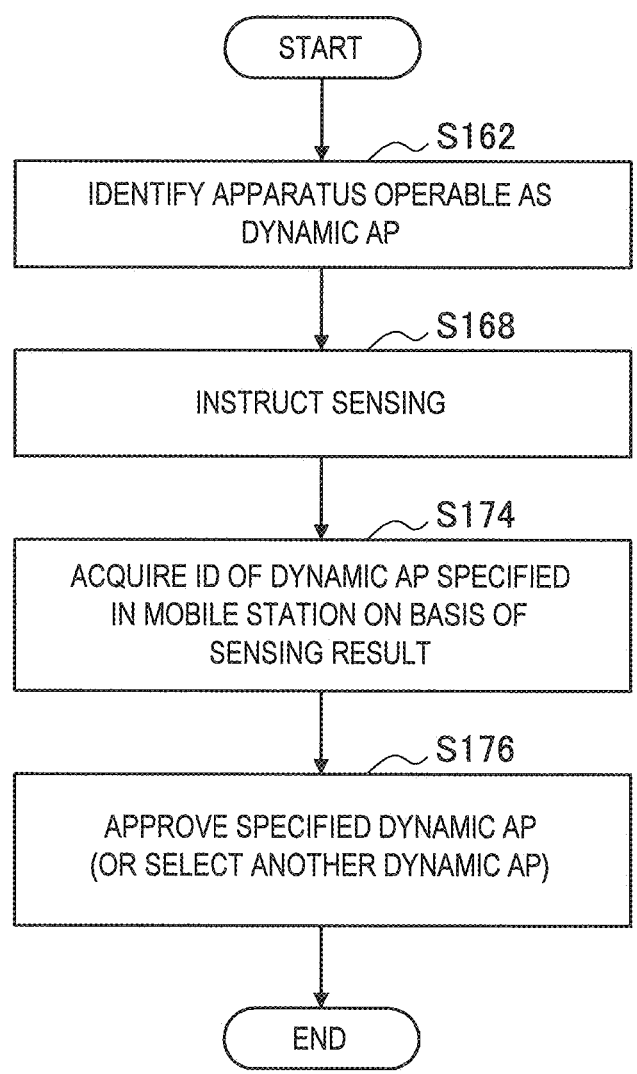
FIG. 7C is a flow chart illustrating a third example of a detailed flow of the access point selection processing shown in FIG. 5.

FIG. 7C is a flow chart illustrating a third example of a detailed flow of the access point selection processing shown in FIG. 5. With reference to FIG. 7C, first, the AP selection unit 134 identifies the apparatus operable as the dynamic AP by using, for example, the capability information of the mobile station (Step S162). Next, the AP selection unit 134 instructs the mobile station to perform sensing of the radio signal transmitted from the dynamic AP, via the signaling unit 136 (Step S168). Note that the instruction here may be omitted and the sensing may be autonomously executed by the mobile station. Next, the AP selection unit 134 acquires the device ID of the dynamic AP specified by the mobile station on the basis of the sensing result (Step S174). Then, the AP selection unit 134 approves the dynamic AP specified by the mobile station (or selects another dynamic AP without approving the dynamic AP) (Step S176).

3. Configuration of Dynamic AP

In this section, the configuration of the dynamic AP that normally operates as the mobile station, and, if necessary, operates as the access point, will be discussed.

[3-1. Configuration Example of Apparatus]

Figure 8:
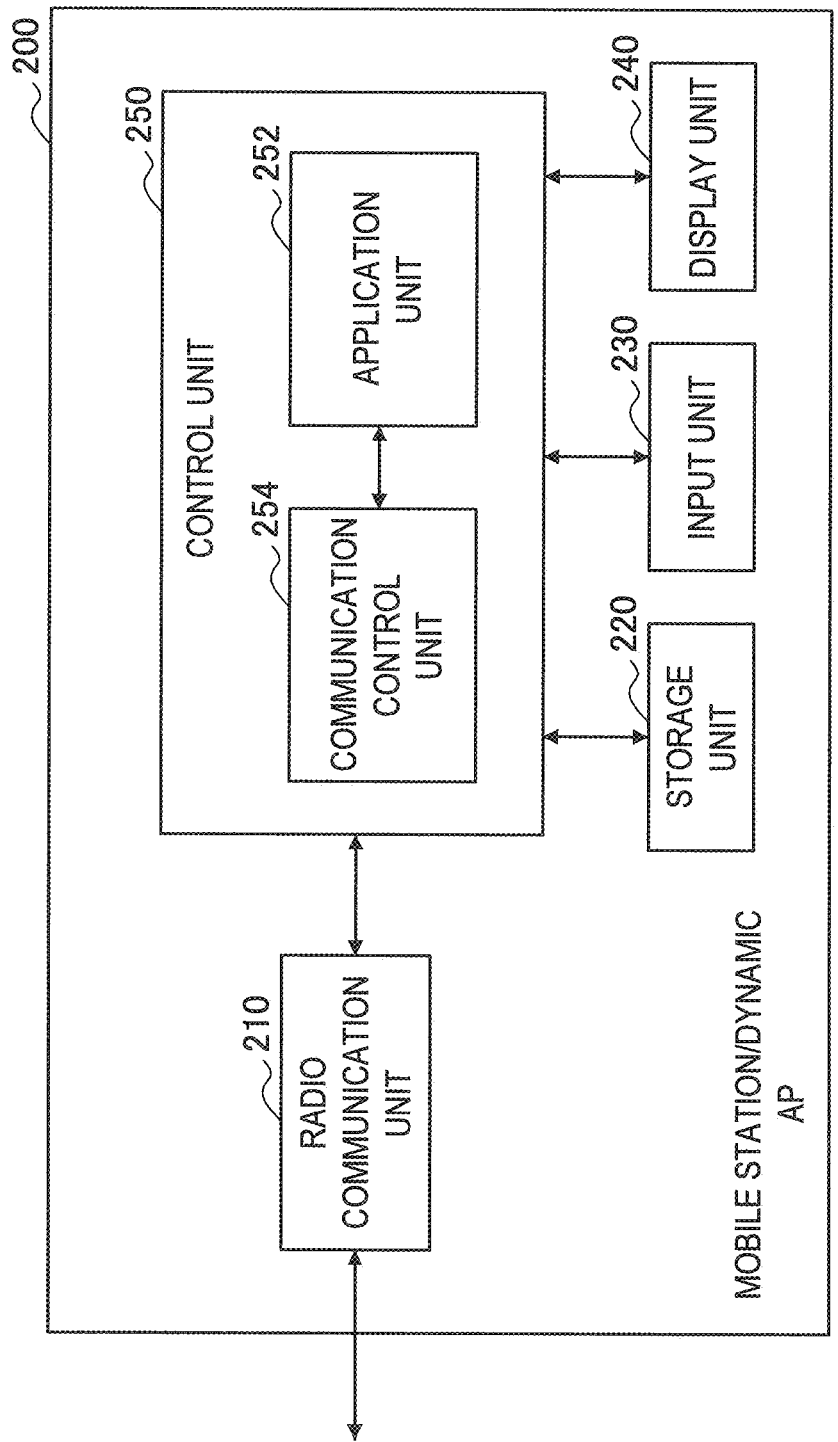
FIG. 8 is a block diagram illustrating one example of a configuration of a dynamic AP according to an embodiment.

FIG. 8 is a block diagram illustrating one example of the configuration of a dynamic AP 200 according to an embodiment. With reference to FIG. 8, the dynamic AP 200 includes a radio communication unit 210, a storage unit 220, an input unit 230, a display unit 240, and a control unit 250.

(1) Radio Communication Unit

The radio communication unit 210 is a radio communication interface for executing the radio communication by the dynamic AP 200. When the dynamic AP 200 operates as the mobile station, the radio communication unit 210 establishes the radio connection between itself and any base station to transmit and receive the radio signal. When the dynamic AP 200 operates as the access point, the radio communication unit 210 further establishes the access link between itself and the mobile station to transmit and receive the radio signal on the access link. The access link, as one example, may be operated by a time division duplex (TDD) system on a time-frequency resource that can be assigned by the networking control node 100 or the base station. The radio communication unit 210 may have a duplexer for preventing interference between the transmission signal and the reception signal within a radio frequency (RF) circuit when relaying traffic.

The radio communication unit 210 may previously have a unique mobile router function for operating as the access point. Instead, the radio communication unit 210 may operate as the access point by allowing a communication control unit 254 described later to execute a function module downloaded from an external server.

(2) Storage Unit

The storage unit 220 stores a program and data for the operation of the dynamic AP 200 by using a storage medium such as a hard disk or a semiconductor memory. The data stored by the storage unit 220 can include the information on the mobile station, and the information on the connection-destination cell, and the like. The program stored by the storage unit 220 can include the function module for the mobile router function.

(3) Input Unit

The input unit 230 includes one or more input devices for inputting information to the dynamic AP 200 by a user. The input unit 230 may include, for example, a touch sensor integrated with the display unit 240. Further, the input unit 230 may include other types of input devices such as a key pad, a button, a switch, or a wheel.

(4) Display Unit

The display unit 240 is a display module configured by a liquid crystal display (LCD) or an organic light-emitting diode (OLED), or the like. The display unit 240 displays, for example, a setting screen for setting the operation of the dynamic AP 200 by a user.

(5) Control Unit

The control unit 250 controls the overall operation of the dynamic AP 200 by using the processor such as the CPU or the DSP. In this embodiment, the control unit 250 includes an application unit 252, and the communication control unit 254.

(5-1) Application Unit

The application unit 252 executes an application. The application executed by the application unit 252 can include, for example, a communication application such as a voice call client, an Internet browser, a mailer or an SNS client.

(5-2) Communication Control Unit

The communication control unit 254 controls the radio communication by the dynamic AP 200. For example, the communication control unit 254, when the dynamic AP 200 operates as the mobile station, allows the radio communication unit 210 to transmit an uplink signal and allows the radio communication unit 210 to receive a downlink signal. Further, the communication control unit 254 exchanges the signaling between itself and the networking control node 100 described above. For example, the communication control unit 254, when sufficient communication quality for the communication application is not obtained, may transmit the control request to the networking control node 100.

Moreover, the communication control unit 254, when being instructed to operate as the access point from the networking control node 100, allows the radio communication unit 210 to operate as the access point. The communication control unit 254, when the radio communication unit 210 has no unique mobile router function, may download the function module of the mobile router function from the external server to execute the downloaded function module, thereby allowing the radio communication unit 210 to operate as the access point. The communication control unit 254, when operating as the access point, acquires the identification information of the connection-destination cell from the networking control node 100. Then, the communication control unit 254 allows the radio communication unit 210 to relay the traffic of the mobile station between the connection-destination cell identified by the obtained identification information and the mobile station. The communication control unit 254 can also acquire other parameters (for example, a frequency band, timing, maximum transmission power, a radio access technology, a spectrum mask or an encryption scheme, or the like) from the networking control node 100.

Moreover, the communication control unit 254, when being instructed to transmit the radio signal for the sensing by the adjacent mobile station from the networking control node 100, allows the radio communication unit 210 to transmit the radio signal at the instructed timing, period and frequency band, thereby allowing the sensing, that is, the measurement of the communication quality by the adjacent mobile station.

The communication control unit 254, when the dynamic AP 200 operates as the mobile station, may execute the sensing for the radio signal from the adjacent dynamic AP in response to the instruction from the networking control node 100. Further, the communication control unit 254 may specify the optimum apparatus to be operated as the AP among the adjacent one or more dynamic APs on the basis of the sensing result. The communication control unit 254 can report the sensing result, or the device ID of the specified dynamic AP to the networking control node 100.

Note that the report from the mobile station to the networking control node 100 may be performed via any type of communication means such as an air interface, an internet protocol (IP)-based backhaul link, a mesh network of IEEE802.11s, or an ad hoc network utilizing Bluetooth (registered trademark) and Zigbee.

[3-2. Example of Processing Flow]

Figure 9:
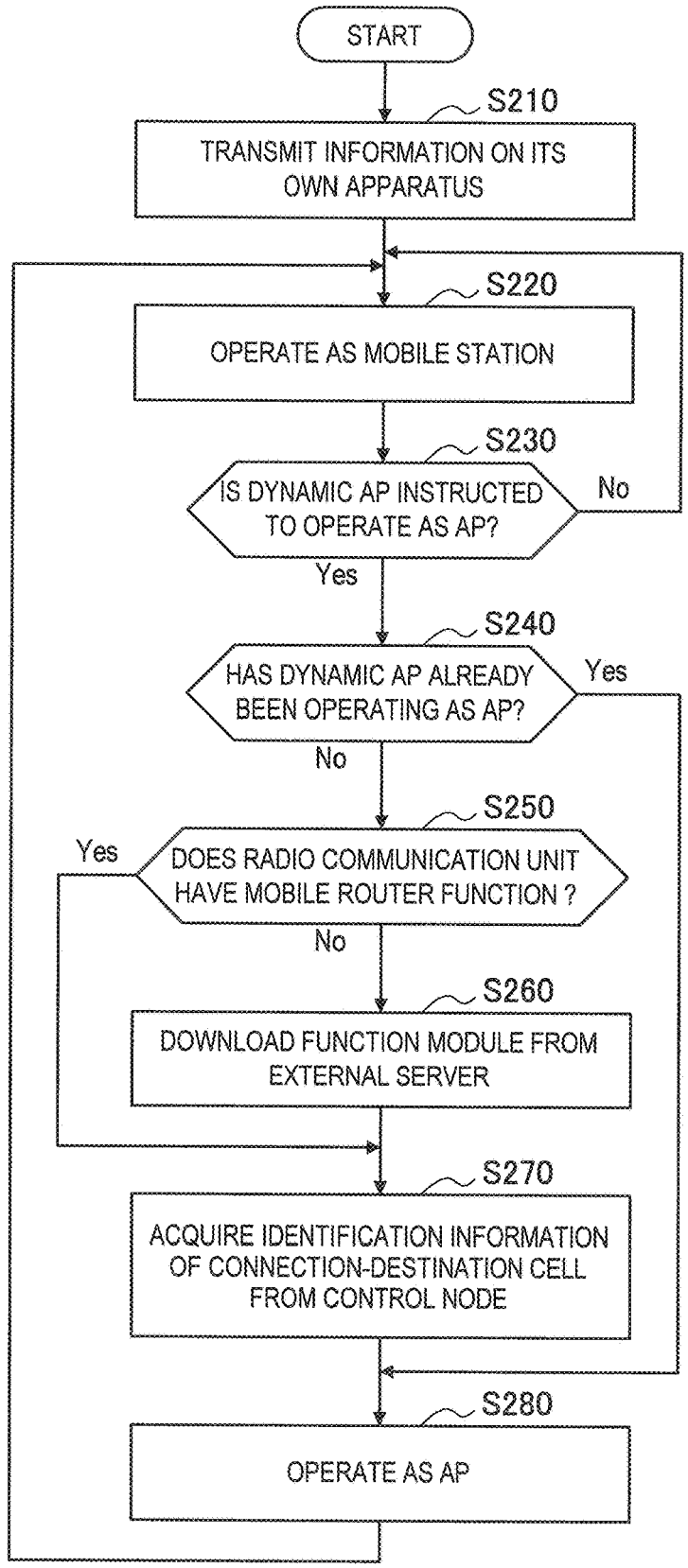
FIG. 9 is a flow chart illustrating one example of a processing flow that can be executed by the dynamic AP shown in FIG. 8.

FIG. 9 is a flow chart illustrating one example of a processing flow that can be executed by the dynamic AP 200 shown in FIG. 8.

With reference to FIG. 9, first, the communication control unit 254 transmits information on its own apparatus that can include the device ID, the position, the capability information and the battery information and the like, to the networking control node 100 (or the database on the core network 13) (Step S210). Then, the communication control unit 254 allows the dynamic AP 200 to operate as the mobile station (Step S220). The operation as the mobile station may be continued while the dynamic AP 200 is operating. The uplink signal transmitted from the radio communication unit 210 can be subjected to the sensing by the adjacent mobile station, if necessary.

When being instructed to operate as the access point from the networking control node 100 (Step S230), the dynamic AP 200 starts operating as the access point. When the dynamic AP 200 is already operating as the access point, the subsequent processing from Step S250 to Step S270 can be skipped (Step S240). When the dynamic AP 200 does not operate as the access point, the communication control unit 254 determines whether the radio communication unit 210 has the mobile router function (Step S250). When the radio communication unit 210 does not have the mobile router function, the communication control unit 254 downloads the function module of the mobile router function from the external server, and executes the downloaded function module (Step S260). Next, the communication control unit 254 acquires the identification information of the connection-destination cell from the networking control node 100 (Step S270). Then, the communication control unit 254 is connected to the connection-destination cell identified by the acquired identification information, and operates as the access point (Step S280).

Although not shown in FIG. 9, the communication control unit 254 may confirm whether the operation as the access point is allowed, to a user via a user interface provided by the input unit 230 and the display unit 240, before Step S280.

4. Overall Processing Sequence

Figure 10:
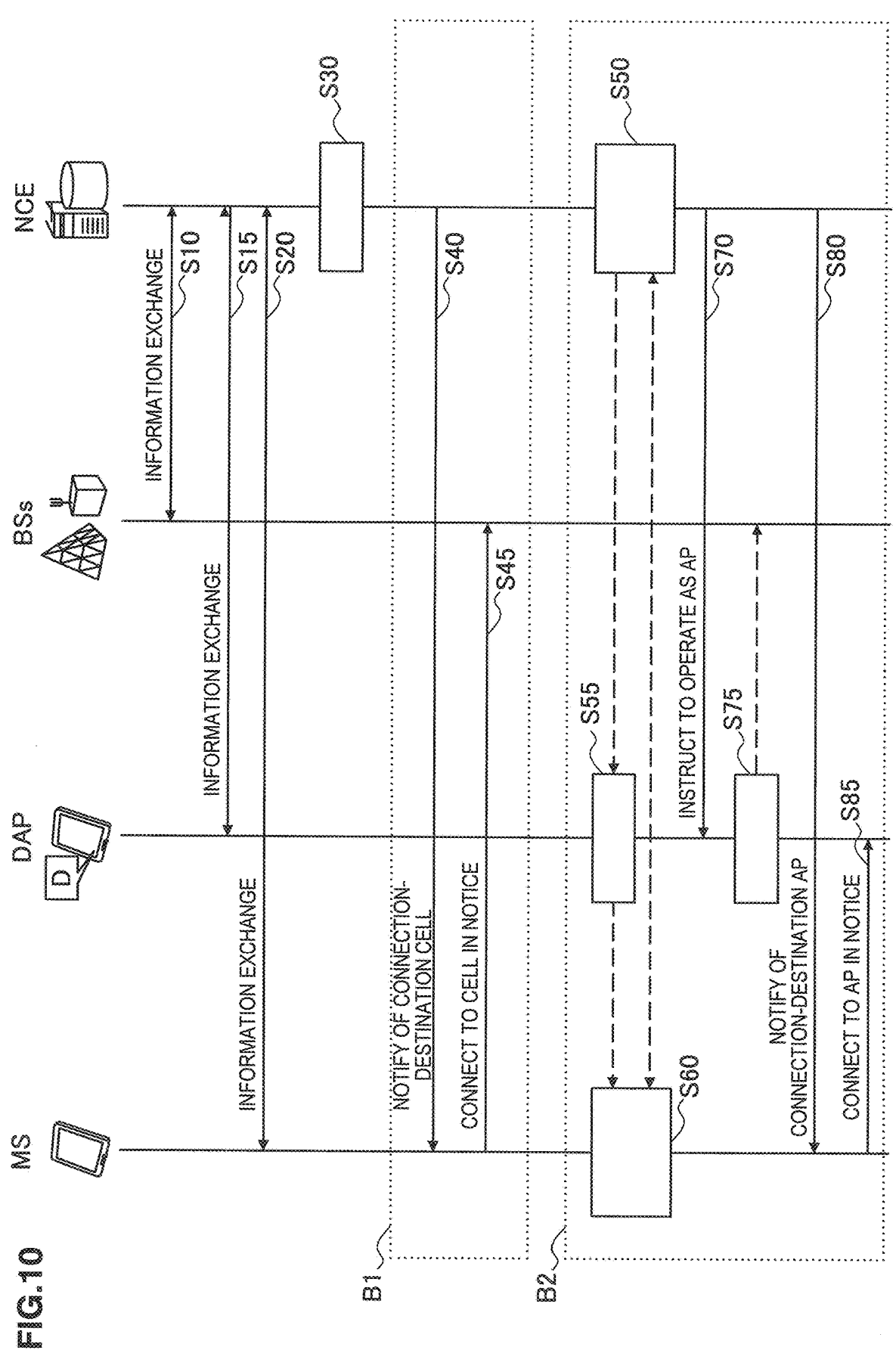
FIG. 10 is a sequence diagram illustrating one example of a processing flow in a communication control system according to an embodiment.

FIG. 10 is a sequence diagram illustrating one example of a processing flow in a communication control system according to an embodiment. The communication control system can include one or more mobile stations (MSs), one or more dynamic access points (DAPs), one or more base stations (BSs) for cells, and a networking control entity (NCE). The dynamic access point may be physically the same apparatus as the mobile station.

The networking control entity first collects the information on the cells from each of the mobile stations (Step S10). Further, the networking control entity collects the information on the mobile stations from the dynamic access points and the other mobile stations (Steps S15 and S20).

Next, the networking control entity, when recognizing the trigger for the control, executes the control-destination determination processing (Step S30). After that, when it is determined that the mobile station can be directly connected to the connection-destination cell as the result of the control-destination determination processing, the sequence surrounded by the box B1 is executed. On the other hand, when it is determined that the mobile station should communicate via the access point, the sequence surrounded by the box B2 is executed.

When it is determined that the mobile station can be directly connected to the connection-destination cell, the networking control entity notifies the mobile station of the identification information and other information of the connection-destination cell determined to communicate with the mobile station (Step S40). Then, the mobile station executes cell search, is synchronized with the connection-destination cell by using the identification information in the notice, and is connected to the connection-destination cell (Step S45).

When it is determined that the mobile station should communicate via the access point, the networking control entity further executes the AP selection processing (Step S50). The dynamic AP can support the AP selection processing by transmitting the radio signal for measuring the communication quality by the mobile station (Step S55). The mobile station measures the communication quality for the radio signal transmitted from each of the dynamic APs (Step S60). The measurement result here or the device ID of the dynamic AP specified by the mobile station is reported to the networking control entity.

The networking control entity instructs the dynamic AP selected as the result of the AP selection processing to operate as the access point (Step S70). Then, the dynamic AP establishes the radio connection between itself and the connection-destination cell to start operating as the access point for the mobile station (Step S75). Further, the networking control entity notifies the mobile station of the identification information and other information of the selected dynamic AP (Step S80). Then, the mobile station is synchronized with the dynamic AP by using the identification information in the notice, and is connected to the dynamic AP (Step S85).

<Summary>

Up to here, an embodiment of a technology according to the present disclosure has been discussed in detail by using FIG. 1 to FIG. 10. According to an embodiment described above, when the mobile station located within the one or more cells communicates, the networking control entity determines whether the mobile station communicates via the AP. Then, when it is determined that the mobile station should communicate via the AP, the mobile station is connected to any cell via the AP selected from the one or more dynamic APs. The networking control node instructs the selected dynamic AP to operate as the AP. Accordingly, under the heterogeneous network environment, the connection relationship between the mobile station and the cell, which is more suitable in terms of, for example, system capacity or service quality, can be dynamically constructed. That is, the flexible radio networking according to a situation of the mobile station becomes possible.

Moreover, according to an embodiment described above, the networking control entity notifies the selected dynamic AP of the identification information of the connection-destination cell. Accordingly, when the plurality of cells that can be connected by the dynamic AP exist, the dynamic AP can be connected to the optimum cell determined by the networking control entity to operate as the AP for the mobile station.

Moreover, according to an embodiment described above, the dynamic AP to be operated as the AP for the mobile station can be selected on the basis of the position of the one or more dynamic APs. Accordingly, in such a case where the mobile stations operable as the AP within a certain limited region are densely located, allowing one of the mobile stations to operate as the AP can facilitate the spatial separation of the mobile stations, and can prevent these mobile stations from generating the harmful inter-cell interference. Further, an offloading effect of traffic can be also expected by changing the radio access technology of the AP.

Moreover, according to an embodiment described above, the dynamic AP to be operated as the AP for the mobile station can be selected on the basis of the quality of the radio signal from the one or more dynamic APs. Accordingly, the access link having better communication quality can be provided to the mobile station that is experiencing poor communication quality due to the reason of being located around a cell edge or behind an obstacle, or the like.

Note that the series of control processing by the respective apparatuses described herein may be implemented by using any of software, hardware, and a combination of software and hardware. Programs constituting the software are previously stored in, for example, a recording medium (or a non-transitory recording medium) provided in the inside or the outside of the respective apparatuses. And the respective programs are, for example, read into a random access memory (RAM) during execution and executed by the processor such as the CPU.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

A communication control apparatus including:

a determination unit that, when a mobile station communicates with any of one or more cells, determines whether the mobile station should communicate via an access point;

a selection unit that, when it is determined that the mobile station should communicate via the access point, selects an apparatus that operates as the access point for the mobile station; and a signaling unit that instructs the apparatus selected by the selection unit to operate as the access point, and instructs the mobile station to communicate via the apparatus.

(2)

The communication control apparatus according to (1), wherein the apparatus that operates as the access point is a terminal apparatus capable of operating as the access point that exists adjacent to the mobile station.

(3)

The communication control apparatus according to (2), wherein the determination unit determines the cell that should communicate with the mobile station out of the one or more cells according to a predetermined determination criterion, and wherein the signaling unit notifies the apparatus selected by the selection unit of identification information of the cell determined by the determination unit.

(4)

The communication control apparatus according to (2) or (3), wherein the selection unit selects the apparatus that operates as the access point on the basis of positions of one or more terminal apparatuses capable of operating as access points.

(5)

The communication control apparatus according to (2) or (3), wherein the selection unit selects the apparatus that operates as the access point on the basis of quality measured for radio signals transmitted from one or more terminal apparatuses capable of operating as access points.

(6)

The communication control apparatus according to (5), wherein the selection unit selects the apparatus that operates as the access point further on the basis of at least one parameter of performance, mobility, a remaining battery level and availability of a communication link of the one or more terminal apparatuses.

(7)
The communication control apparatus according to (2) or (3),
wherein the selection unit selects a terminal apparatus specified by the mobile station on the basis of a measurement result of communication quality as the apparatus that operates as the access point.
The communication control apparatus.
(8)
The communication control apparatus according to (3),
wherein the determination unit determines that the mobile station should communicate via the access point in a case where, when the mobile station directly communicates with the respective cells, no cells satisfy the determination criterion.
(9)
The communication control apparatus according to (8),
wherein the determination criterion is related to at least one of communication quality, a load of traffic and power consumption efficiency.
(10)
The communication control apparatus according to any one of (1) to (9), wherein the one or more cells include a macro cell and a small cell.
(11)
A terminal apparatus including:
a radio communication unit capable of operating as an access point; and
a communication control unit that exchanges signaling between the communication control unit and a control node that determines whether a mobile station should communicate via the access point when the mobile station communicates with any of one or more cells,
wherein the communication control unit, when being instructed to operate as the access point from the control node, allows the radio communication unit to operate as the access point.
(12)
The terminal apparatus according to (11),
wherein the communication control unit acquires identification information of the cell that communicates with the mobile station, from the control node, and allows the radio communication unit to relay traffic of the mobile station between the cell identified by the acquired identification information and the mobile station.
(13)
The communication control apparatus according to (11) or (12),
wherein the radio communication unit has a unique mobile router function.
(14)
The communication control apparatus according to (11) or (12),
wherein the radio communication unit operates as the access point by executing a function module downloaded from an external server.
(15)
A communication control method including:
in a control node that controls formation of a radio network within one or more cells,
determining whether a mobile station should communicate via an access point when the mobile station communicates with any of the one or more cells;
selecting an apparatus that operates as the access point for the mobile station when it is determined that the mobile station should communicate via the access point;
instructing the selected apparatus to operate as the access point; and
instructing the mobile station to communicate via the selected apparatus.
(16)
A program for causing a computer of a control node that controls formation of a radio network within one or more cells to function as:
a determination unit that determines whether a mobile station should communicate via an access point when the mobile station communicates with any of the one or more cells;
a selection unit that selects an apparatus that operates as the access point for the mobile station when it is determined that the mobile station should communicate via the access point; and
a signaling unit that instructs the apparatus selected by the selection unit to operate as the access point, and instructs the mobile station to communicate via the apparatus.
(17)
A communication control system including:
one or more terminal apparatuses capable of operating as an access point; and
a communication control apparatus including
a determination unit that determines whether a mobile station should communicate via the access point when the mobile station communicates with any of one or more cells,
a selection unit that selects an apparatus that operates as the access point for the mobile station from the one or more terminal apparatuses when it is determined that the mobile station should communicate via the access point, and
a signaling unit that instructs the terminal apparatus selected by the selection unit to operate as the access point, and instructs the mobile station to communicate via the terminal apparatus.

REFERENCE SIGNS LIST 100 communication control apparatus (networking control node)
132 determination unit
134 selection unit
136 signaling unit
200 terminal apparatus (dynamic AP)
210 radio communication unit
254 communication control unit

The invention claimed is:
1. A communication control apparatus of a control node that controls formation of a radio network within one or more cells comprising:
a determination unit configured to:
determine a cell of the one or more cells that a first mobile station is to communicate with; and
determine whether the first mobile station should communicate with the cell via a second mobile station;
a selection unit configured to:
when it is determined that the first mobile station should communicate with the cell via the second mobile station, select the second mobile station from one or more mobile stations capable of relaying traffic between the first mobile station and the cell based on positions of the first mobile station and the second mobile station and at least one parameter of performance, mobility, and remaining battery level of the second mobile station; the selection unit further configured to determine if the second mobile station includes a router function module, and if the second mobile station does not include the router function module, downloads the router function module from a server; and a signaling unit configured to:
instruct the second mobile station to transmit a radio signal for sensing by the first mobile station; and
determine at least one transmission parameter to be used for relaying traffic between the first mobile station and the cell via the second mobile station;
wherein the second mobile station exists adjacent to the first mobile station such that interference occurs when the first mobile station and the second mobile station transmit signals.

2. The communication control apparatus according to claim 1,
wherein the determination unit is further configured to determine the cell that the first mobile station is to communicate with according to a predetermined determination criterion; and
wherein the signaling unit is further configured to notify the second mobile station selected by the selection unit of identification information of the determined cell.

3. The communication control apparatus according to claim 1,
wherein the selection unit is further configured to select the second mobile station to relay traffic between the first mobile station and the cell on the basis of quality measured for radio signals transmitted from the one or more mobile stations capable of relaying traffic between the first mobile station and the cell.

4. The communication control apparatus according to claim 1,
wherein the selection unit is further configured to select the second mobile station based on a measurement result of communication quality of the second mobile station relaying traffic between the first mobile station and the cell.

5. The communication control apparatus according to claim 2,
wherein the determination unit is further configured to determine that the first mobile station is to communicate with the cell via the second mobile station when it is determined that when the first mobile station communicates with respective cells, no cells satisfy the determination criterion.

6. The communication control apparatus of claim 5,
wherein the determination criterion is related to at least one of communication quality, a load of traffic, and power efficiency.

7. The communication control apparatus of claim 1,
wherein the one or more cells include a macro cell and a small cell.

8. The communication control apparatus of claim 1, wherein the selection unit is further configured to receive a result of sensing by the first mobile station of the radio signal transmitted by the second mobile.

9. The communication control apparatus of claim 8, wherein the selection unit is further configured to select the second mobile station based on the received result of sensing.

10. The communication control apparatus of claim 8, wherein the sensing result comprises a measure of communication quality between the first mobile station and the second mobile station.

11. A communication apparatus comprising:
a radio communication unit capable of relaying traffic between a mobile station and a cell;
a communication control unit configured to:
exchange signaling between the communication control unit and a control node that determines whether the mobile station is to communicate with the cell via the communication apparatus; and
when being instructed to relay traffic between the mobile station and the cell:
receive, from the control node, identification information of the cell;
transmit a radio signal using at least one transmission parameter determined by the control node;
determine parameters to be used for relaying traffic between the mobile station and the cell;
determine if the radio communication unit includes a router function module, and if the radio communication unit does not include the router function module, downloads the router function module from a server; and
use the radio communication unit to relay traffic between the mobile station and the cell
wherein the radio communication unit is further configured to sense one or more radio signals from one or more candidate mobile stations when the communication control unit receives instructions from the control node to search for a second mobile station via which to communicate with a destination cell, the candidate mobile stations being disposed such that interference occurs when the candidate mobile stations transmit signals.

12. The communication apparatus of claim 11, wherein the control node determines whether the mobile station is to communicate with the cell via the communication apparatus on the basis of at least one parameter of performance, mobility, and remaining battery level of the terminal apparatus.

13. The communication apparatus of claim 11,
wherein the communication control unit is further configured to acquire identification information of the cell from the control node and to allow the radio communication unit to relay traffic between the mobile station and the cell using the acquired identification information.

14. The communication apparatus of claim 11,
wherein the radio communication unit has a unique mobile router function.

15. The communication apparatus of claim 11,
wherein the radio communication unit is further configured to relay the traffic between the mobile station and the cell by executing a function module downloaded from an external server.

16. The communication control apparatus of claim 11, wherein the radio communication unit is further configured to transmit a radio signal using at least one transmission parameter specified by the control node when the communication control unit receives instructions from the control node to transmit a radio signal for sensing by the mobile station.

17. The communication control apparatus of claim 11, wherein the communication control unit is further configured to select the second mobile station from the one or more candidate mobile stations to use to communicate with the destination cell.

18. The communication control apparatus of claim 17, wherein the communication control unit is further configured to send a device identifier of the second mobile station to the control node.

19. The communication control apparatus of claim 14, wherein the communication control unit is further configured to transmit a signal for sensing by the mobile station when instructed by the control node.

* * * * *